(12) United States Patent
Jauch

(10) Patent No.: US 7,785,047 B2
(45) Date of Patent: Aug. 31, 2010

(54) CUTTING ELEMENT, CUTTER SUPPORT AND HOLLOW DRILL

(76) Inventor: Achim Jauch, Adlerstrasse 12b, Bad Durrheim (DE) 78073

( * ) Notice: Subject to any disclaimer, the term of this patent is extended or adjusted under 35 U.S.C. 154(b) by 482 days.

(21) Appl. No.: 11/720,355

(22) PCT Filed: Nov. 30, 2005

(86) PCT No.: PCT/EP2005/012764

§ 371 (c)(1),
(2), (4) Date: May 29, 2007

(87) PCT Pub. No.: WO2006/058719

PCT Pub. Date: Jun. 8, 2006

(65) Prior Publication Data

US 2008/0131223 A1    Jun. 5, 2008

(30) Foreign Application Priority Data

Nov. 30, 2004   (DE) ...................... 10 2004 057 542

(51) Int. Cl.
*B23B 51/04* (2006.01)
(52) U.S. Cl. .................................. 408/204; 408/239 R
(58) Field of Classification Search ......... 408/204–209, 408/703, 238, 239 R, 239 A; *B23B 51/04, B23B 51/05*
See application file for complete search history.

(56) References Cited

U.S. PATENT DOCUMENTS

| | | | | |
|---|---|---|---|---|
| 1,927,865 A * | 9/1933 | Aldeen | ......................... | 408/56 |
| 2,412,939 A | 12/1946 | Aston | | |
| 2,847,885 A * | 8/1958 | Wagner | ......................... | 408/59 |
| 2,947,206 A * | 8/1960 | Flanagan | .................... | 408/1 R |
| 3,153,885 A * | 10/1964 | Keller et al. | ................. | 451/450 |
| 3,243,924 A * | 4/1966 | Peters | ......................... | 451/488 |
| 3,374,696 A * | 3/1968 | Trevathan | .................... | 408/204 |
| 3,382,743 A | 5/1968 | Trevathan | | |
| 3,494,348 A * | 2/1970 | Lindblad | ...................... | 125/20 |
| 4,072,441 A * | 2/1978 | LaPointe | ..................... | 408/204 |
| 4,077,737 A * | 3/1978 | Morse | ......................... | 408/206 |
| 4,941,783 A * | 7/1990 | Maier | ......................... | 408/204 |
| 5,054,971 A * | 10/1991 | Kieninger et al. | ........... | 408/205 |
| 5,098,234 A | 3/1992 | Judkins et al. | | |
| 5,415,504 A * | 5/1995 | Wolf et al. | ................... | 408/204 |

FOREIGN PATENT DOCUMENTS

| | | |
|---|---|---|
| DE | 7005824 U1 | 6/1970 |
| EP | 24741 A2 * | 3/1981 |

(Continued)

*Primary Examiner*—Daniel W Howell
(74) *Attorney, Agent, or Firm*—Brooks Kushman P.C.

(57) ABSTRACT

The invention relates to a cutting element for a hollow drill comprising a cutting area and an essentially cylindrical area. The essentially cylindrical area has recesses, which are arranged on the inside at regular intervals and open toward the cutting area. In one embodiment of the invention, the recesses extend in an axial direction while being arranged in an interspaced manner preferably in the peripheral direction. The recesses arranged at regular intervals in the peripheral direction produce a geometric shape that is generally described as a polygon. The invention also relates to a cutter support and to a hollow drill. The cutting element is connected to the cutter support via a clamping connection preferably in a manner that enables the cutting element to be detached.

28 Claims, 19 Drawing Sheets

FOREIGN PATENT DOCUMENTS

Figure 1A:
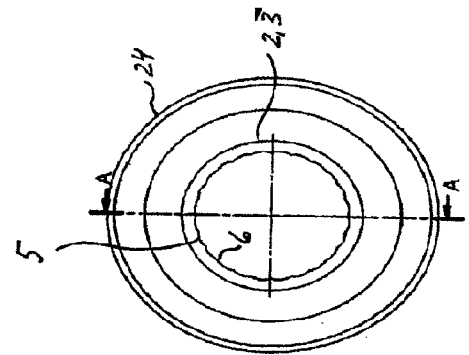
Figure 1C:
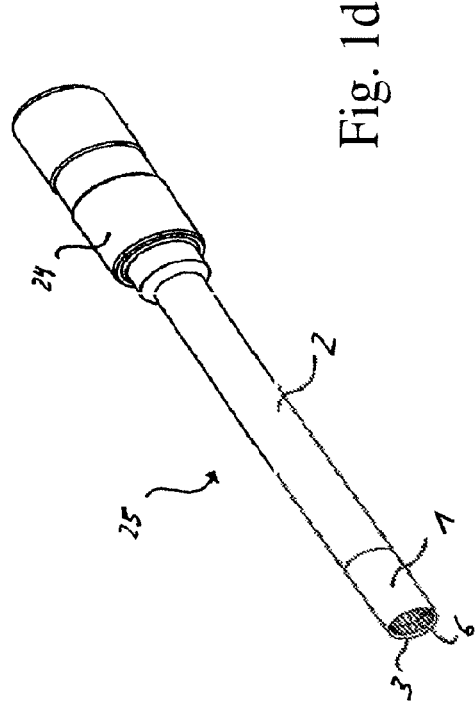
Figure 1B:
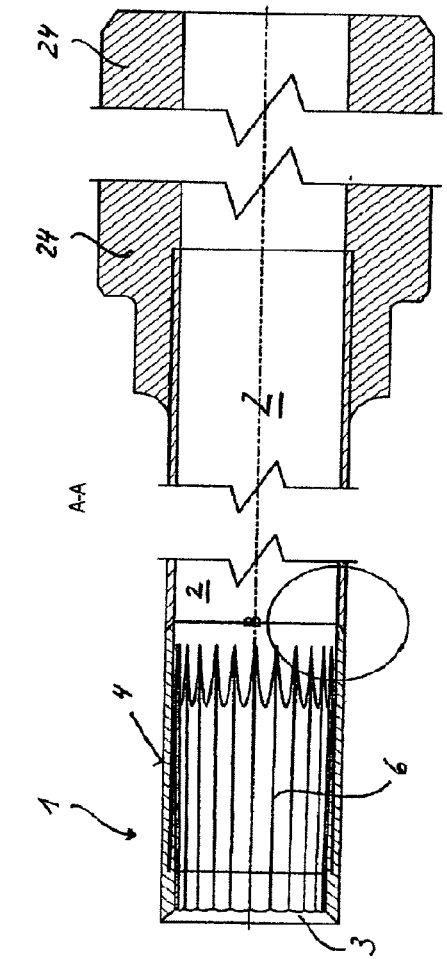
Figure 1D:
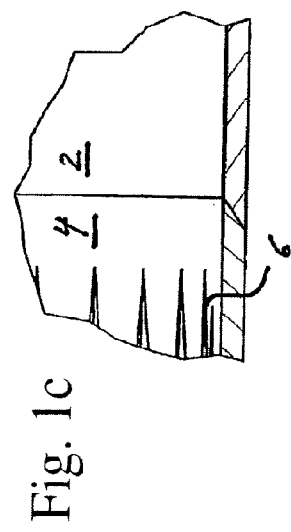

| | | | |
|---|---|---|---|
| FR | 2535635 A1 * | 5/1984 | |
| JP | 59107815 A * | 6/1984 | |
| JP | 09123157 A | 5/1997 | |
| JP | 10202411 A | 8/1998 | |
| JP | 11156617 A | 6/1999 | |
| JP | 2002120218 A * | 4/2002 | |
| JP | 2002301614 A * | 10/2002 | |

* cited by examiner

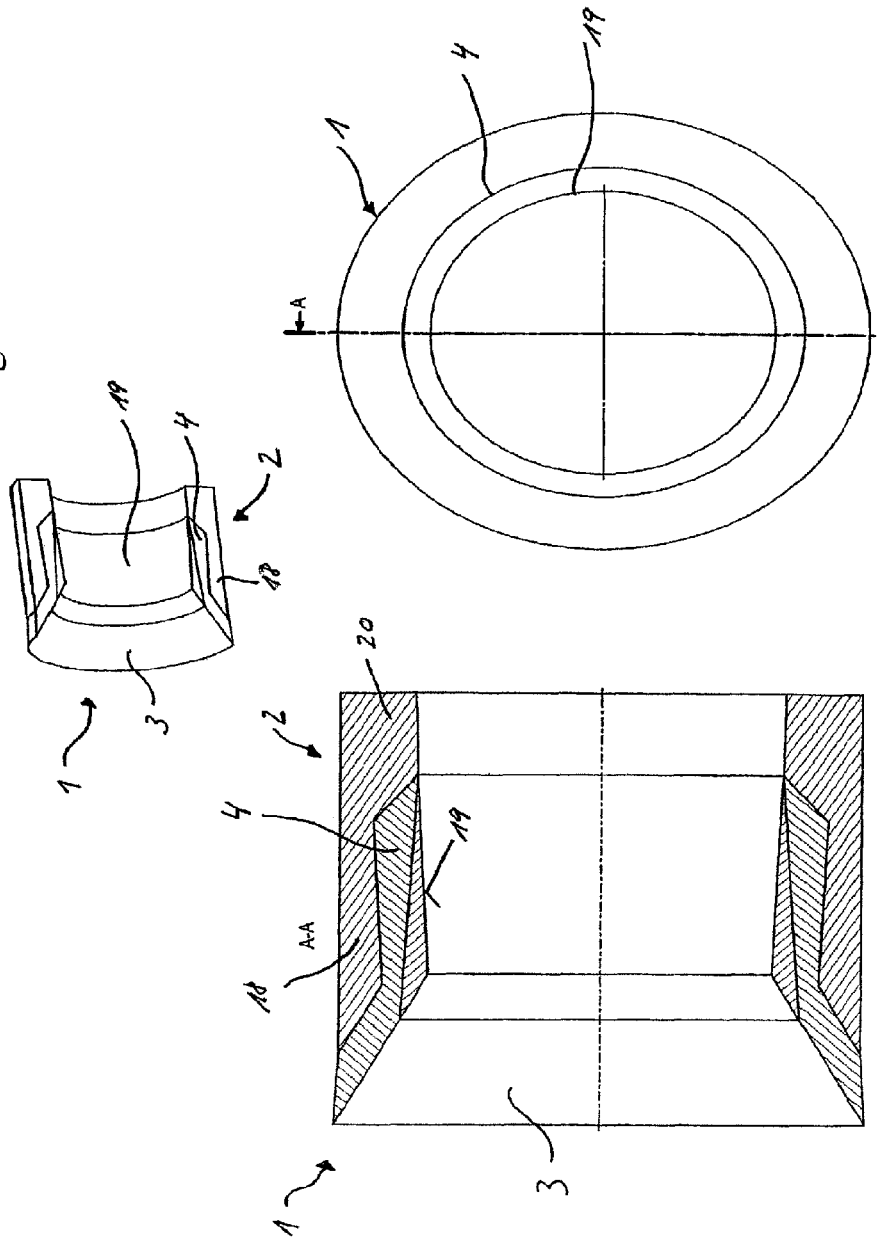

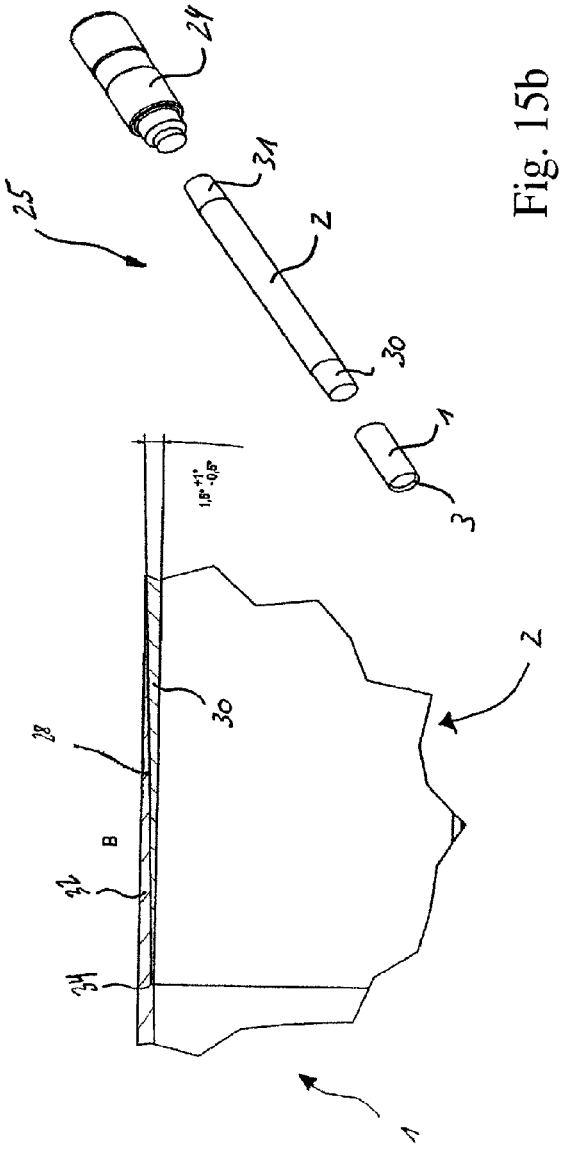

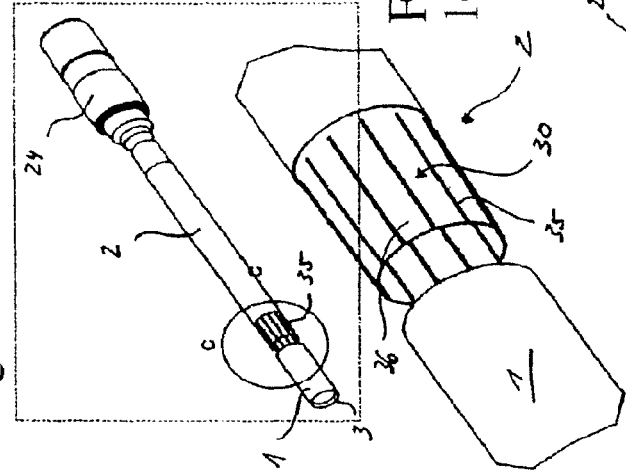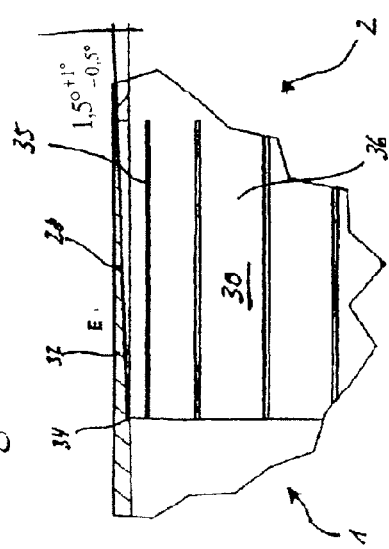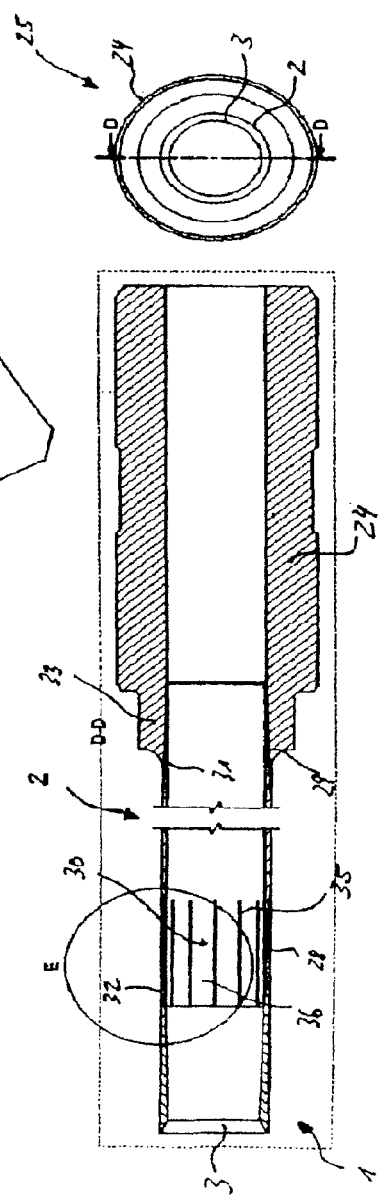

CUTTING ELEMENT, CUTTER SUPPORT AND HOLLOW DRILL

The invention relates to a cutting element according to the preamble of claim 1 and to a cutter support for a hollow drill according to the preamble of claim 19. The invention relates, furthermore, to a hollow drill according to the preamble of claim 25.

Cutting elements, cutter supports and hollow drills of the type referred to here are used, in particular, for making holes in plies of thin sheetlike material, such as, for example, paper, cardboard, plastic film, rubber, etc., or soft resilient materials, such as, for example, foamed material and styropor. A hollow drill is normally driven in rotation and cuts out the drill stock essentially circularly by means of a cutting element. The hollow drill may also be used without an additional rotary drive, in which case the drill stock is punched out by means of the cutting element. The cut-out drill stock is typically discharged outward through a drilling sleeve or a tube. The drilling sleeve is designated hereafter also as a cutter support. The cutting elements, cutter supports and hollow drills may also be combined under the term "drilling tools".

Hollow drills are as far as possible manufactured in one piece from tool steel. Production takes place by the cutting of solid material.

Hollow drills in which the cutting element and cutter support are produced as separate components are also already known. Thus, utility model DE 7005824 U1 describes a paper drill, in which a hard metal bit forming the cutting element is soldered onto the tube of the paper drill on the cutting side. The connection point between the tube and hard metal bit is designed so that these fit one into the other conically. Thus, the soldering surface is increased considerably, and the cone absorbs a large part of the forces which arise.

The patent specification U.S. Pat. No. 5,098,234 likewise discloses a cutting element which is mounted on a separately produced tube. The tube may be produced from the same material as the cutting element or from another material. The tube may also be manufactured by means of a production method other than that for the cutting element. The use of different production methods for the tube and the cutting element leads to a hollow drill having good mechanical properties. The cutting element is designed conically and has convex indentations on its outside.

The patent application JP 11156617 A discloses a diamond-coated hollow drill, in which the annular end is shaped convexly and concavely in the axial direction. The hollow drill is operated in rotation. The concave and convex shapes serve for the suppression of vibrations while the hollow drill is being used.

The object of the invention is to provide a cutting element, a cutter support and a hollow drill which can be used efficiently for drilling.

This object is achieved by means of a cutting element having the features of claim 1.

The cutting element is also designated as a drill bit or cutter. The cutter support is also designated as a tube support or tube. The list of designations is not conclusive.

The cutting element according to the invention comprises a cutting region and an essentially cylindrical region and is distinguished in that the essentially cylindrical region has on the inside depressions arranged at preferably regular intervals and opening in the direction of the cutting region. An efficient use of the cutting element during drilling thereby becomes possible. The depressions may also be designated as cavities.

In an exemplary embodiment of the invention, the depressions run in the axial direction, and they are preferably arranged at a distance from one another in the circumferential direction. The regular depressions arranged in the circumferential direction give rise to a geometric shape which is usually designated as a polygon.

The essentially cylindrical region may have a polygonal inner shape, the edges being connected to one another in each case via a depression. The edges may run rectilinearly; however, they may also be of convex, concave or wavy shape. This results in low friction on the inside of the cutting element. The polygonal inner shape preferably merges on the side opposite the cutting region of the cutting element conically into a cylindrical inner shape.

In a further exemplary embodiment of the invention, the depressions are distinguished by a helical profile on the inside of the essentially cylindrical region. The helical profile may also be designated as a spiral profile or as a profile of polygons twisted on themselves. A plurality of depressions may be provided which are directly contiguous to one another and thereby form a single helical depression. By virtue of this configuration of the depressions, it is possible for the drill stock or cutting stock to be shaped at an early stage at locations defined by the helices, in order to reduce the axial pressures arising during the cutting operation. The configuration of the depressions leads to a directed displacement of the contour lines on the inside of the essentially cylindrical region, by virtue of which displacement a defined deformation, in particular a defined folding of the cutting stock, can be initiated.

Preferably, the cutting region of the cutting element also has depressions which have a preferably helical or spiral profile. By virtue of such a configuration, defined cutting stock deformations can be brought about, which lead to a minimization of the axial pressures arising.

Preferably, a lubricant is embedded in the essentially cylindrical region of the cutting element. This lubricant may be provided, in particular, in the depressions. Particularly preferably, a lubricant is used which changes into the liquid state only when a specific limit temperature is overshot.

In a particularly preferred exemplary embodiment of the invention, the depressions in the essentially cylindrical region of the cutting element are designed as incisions. Thus, in the cylindrical region of the cutting element, what are known as tongues are formed, which extend axially in the opposite direction to the cutting region. The incisions are also designated as slits or tongue slits. They may project into the cutting region. The tongues are pressed outward and therefore against the cutter support by the cutting stock. The incisions may also be provided in that region of the cutter support which is on the cutting element side, so that the cutter support has tongues which extend in the axial direction.

A permanent connection of the cutting element and cutter support, for example by means of soldering, is not required in this embodiment. The cutting element configured in this way is exchangeable. As soon as the cutting element becomes blunt or the cutting stock is changed, the cutting element can advantageously be exchanged for a new or another cutting element. Of course, where this exchangeable cutting element is concerned, too, it is possible to connect it to the cutter support permanently, for example by soldering, adhesive bonding and/or laser welding.

In a further preferred exemplary embodiment, a preferably likewise cylindrical ring is arranged in the essentially cylindrical region. The ring is manufactured, in particular, from steel. However, it may also be manufactured from another material, for example plastic. The ring is preferably used in the case of the exchangeable cutting element described above, in order to increase the pressure force on the tongues if the cutting element is used for cutting such soft materials (for example, very soft foamed materials) which, in themselves, are too soft as cutting stock to press the tongues outward against the cutter support.

The object is achieved, moreover, by means of a cutter support having the features of claim 13.

The cutter support according to the invention has an orifice for the cutting element and is distinguished by a conically designed region, in which the cone angle opens in the opposite direction to the orifice for the cutting element. Furthermore, on the inside of the cutter support, elevations for receiving the depressions of the cutting element are provided, which are designed, in particular, as incisions. The elevations prevent a twisting of the cutting element with respect to the cutter support. The conical configuration of the cutter support makes it difficult for the cutting element to be released or to be pulled out. Preferably, the cone angle is 1° to 6°, particularly preferably 1.5° to 3°, the cone angle being defined as the angle between the axis of the cutter support and the conically designed region of the cutter support.

In a further exemplary embodiment of the cutter support, a cylindrical region is contiguous to the conically designed region in the opposite direction to the orifice for the cutting element and preferably has a smaller diameter than the conically designed region at the location at which it is furthest away from the orifice for the cutting element. This affords on the cutter support a connection point which can bring about a positive connection with the cutting element.

The object is achieved, furthermore, by means of a hollow drill according to claim 16.

The hollow drill according to the invention is distinguished by a cutting element according to the invention and by a cutter support according to the invention, which are produced as separate components. A cutting element and cutter support may be connected releasably to one another by a clamping connection. Alternatively or additionally to the clamping connection, the cutting element may also be connected to the cutter support via an adhesive bond or a soldered and/or welded joint, in particular by means of laser welding.

Preferably, the hollow drill has a shank, on which the hollow drill can be received, for example, by a drilling device which is produced as a separate component. The shank is provided at that end of the cutter support which is opposite the cutting element. The materials of the cutting element, cutter support and shank are selected in each case as a function of the intended use of the respective component. In such a separate type of construction, the cutting element, cutter support and shank may also be produced by means of various production methods. They may, of course, also be made by means of the same production method.

Owing to the separate production of the cutting element, cutter support and/or shank as components, less material waste occurs. Energy can additionally be saved due to the directed choice of the production methods. Thus, for example, hardening may be dispensed with in the cutter support and the shank. In the production of hollow drills, in particular, the procurement possibility, the raw material price, the processability, the hardenability, the coatability and the strength of the material to be processed are relevant. If different materials are used for the various components, the material does not have to be optimized with respect to as many of the listed properties as possible, but, instead, in the case of the shank, for example, a material with lower hardenability and coatability, but with a low raw material price, may be selected, whereas, in the case of the cutting element, a material with high hardenability and good coatability, but also with a high price, could be selected. The separate production of the cutting element, cutter support and shank can thus lead to a favorable production and long service life of the drilling tools. Coatings of the individual components, in particular of the cutting element and/or of the cutter support, likewise lead to an increase in the service life.

For the shank, a material is preferably selected which allows a good chucking of the hollow drill in a spindle. For the cutter support or the tube, a material is preferably selected which has a good endurance strength. The material of the cutting element is selected with a view to increasing the lifetime or service life.

Alternatively to a separate production of the cutter support and shank, these components may also be manufactured from one piece.

Figure 2:
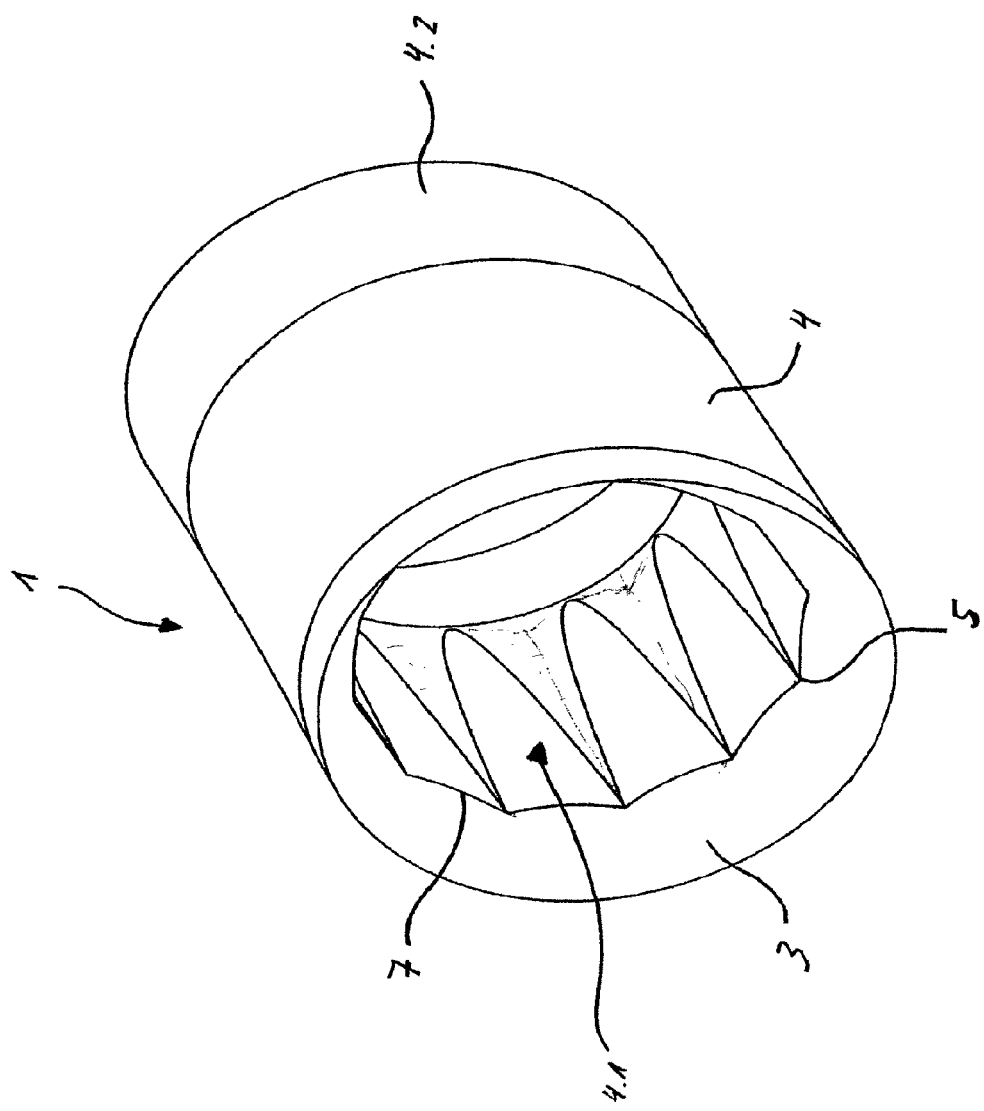
Figure 3:
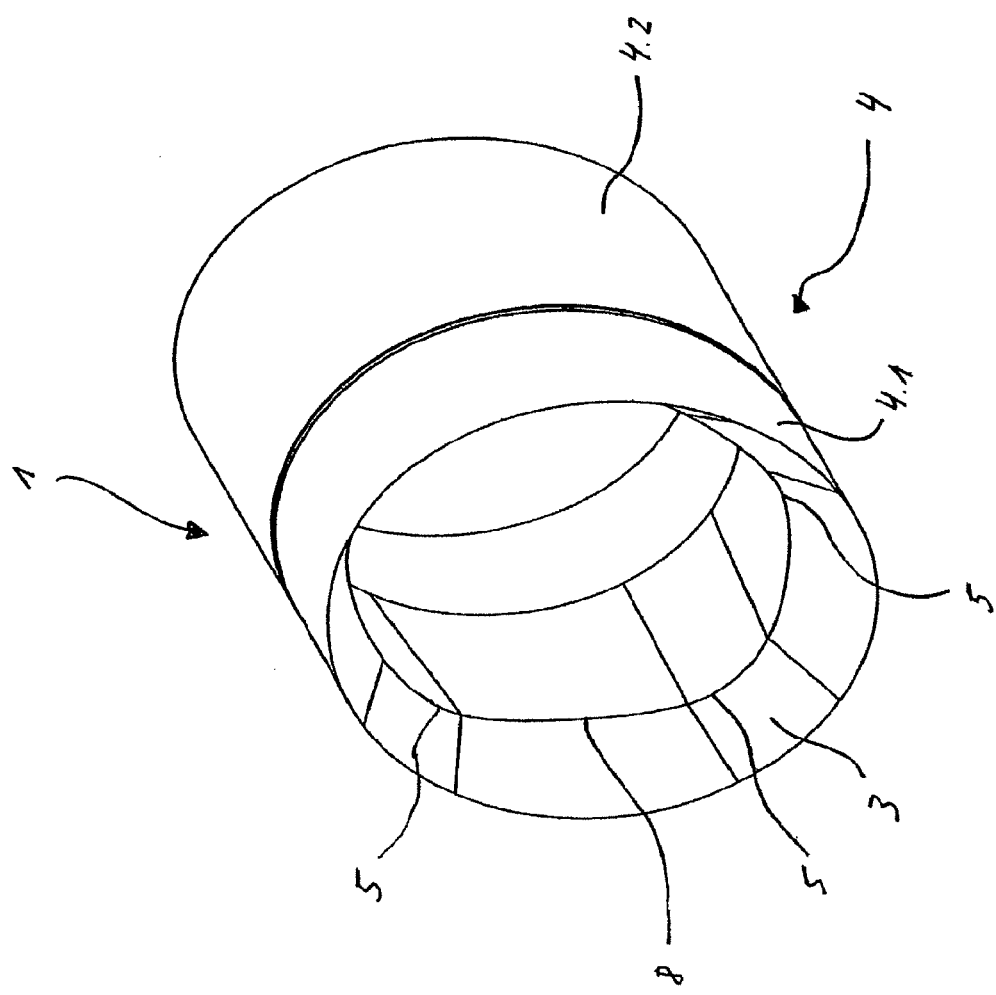
Figure 4:
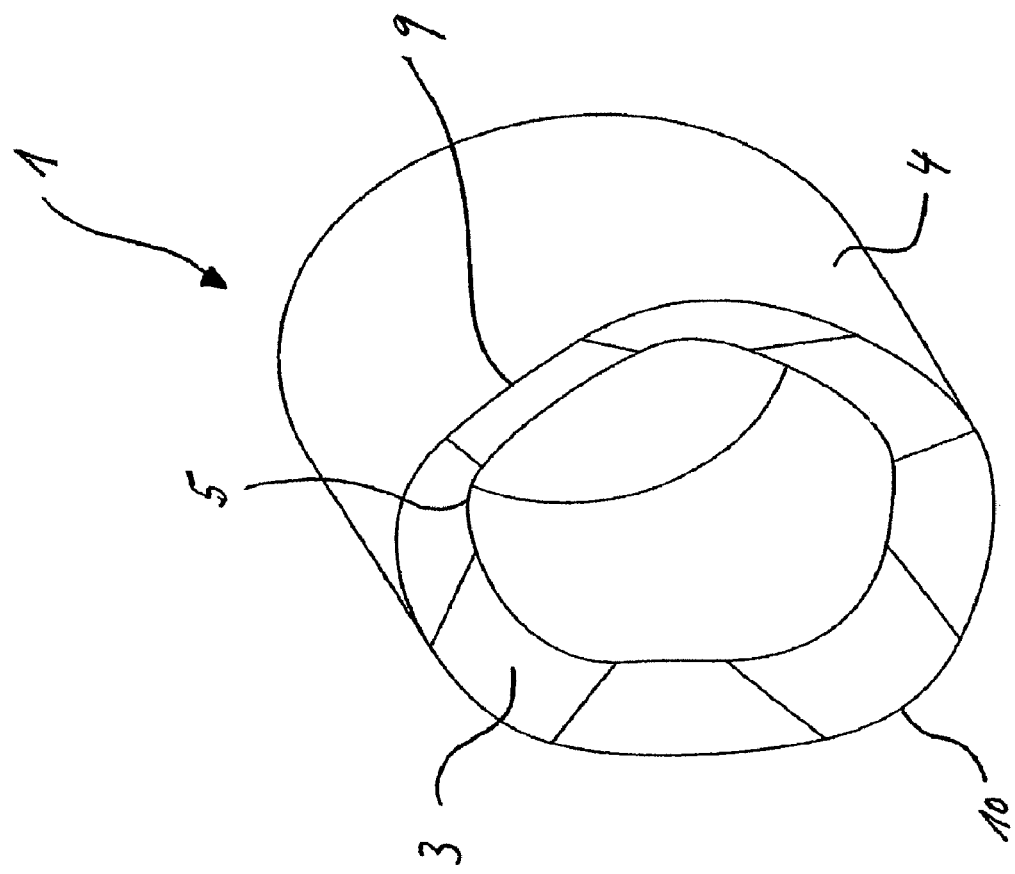
Figure 5:
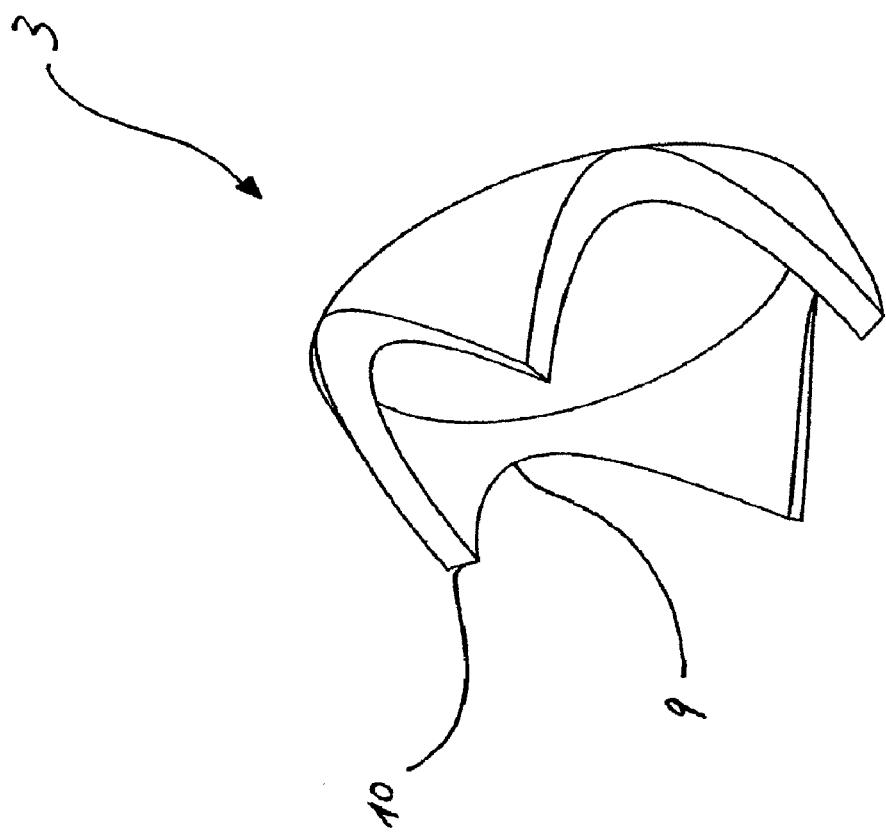
Figure 6:
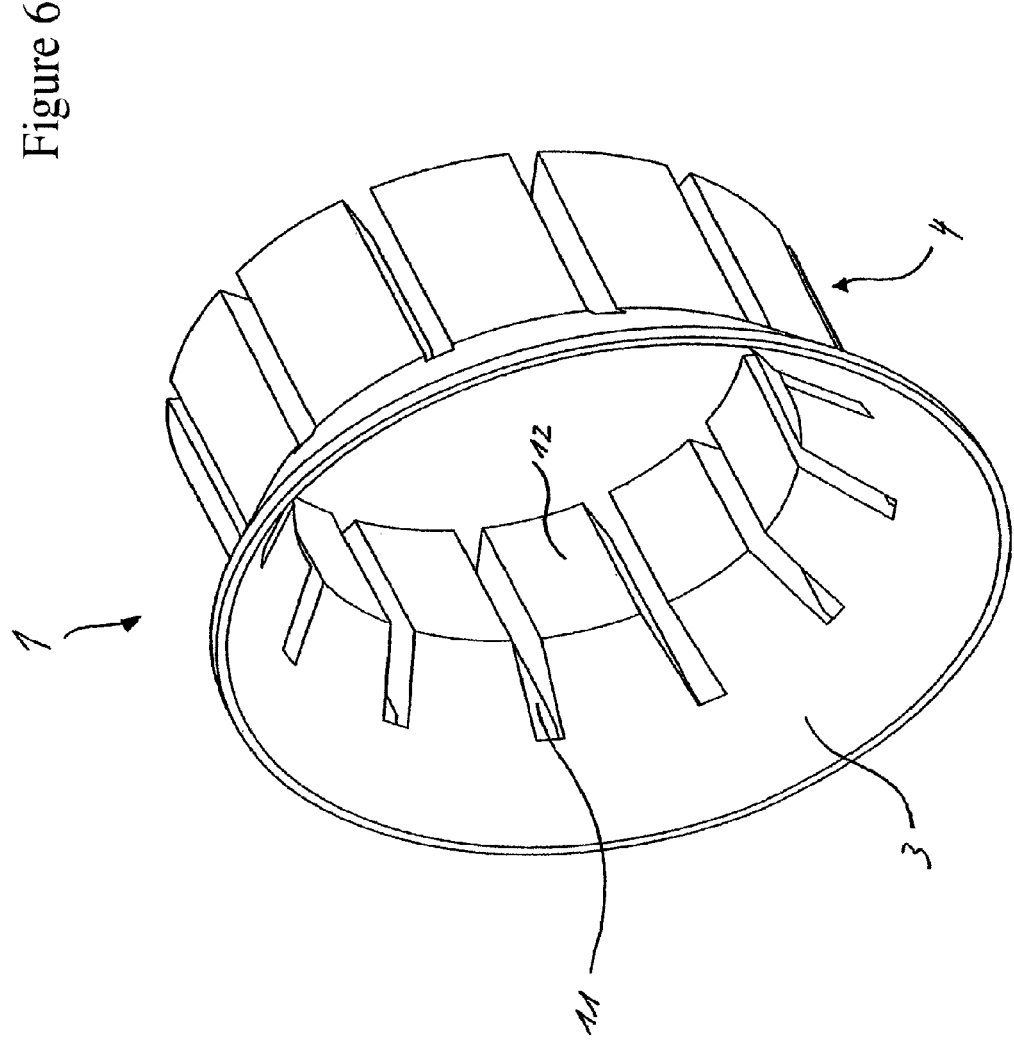
Figure 7:
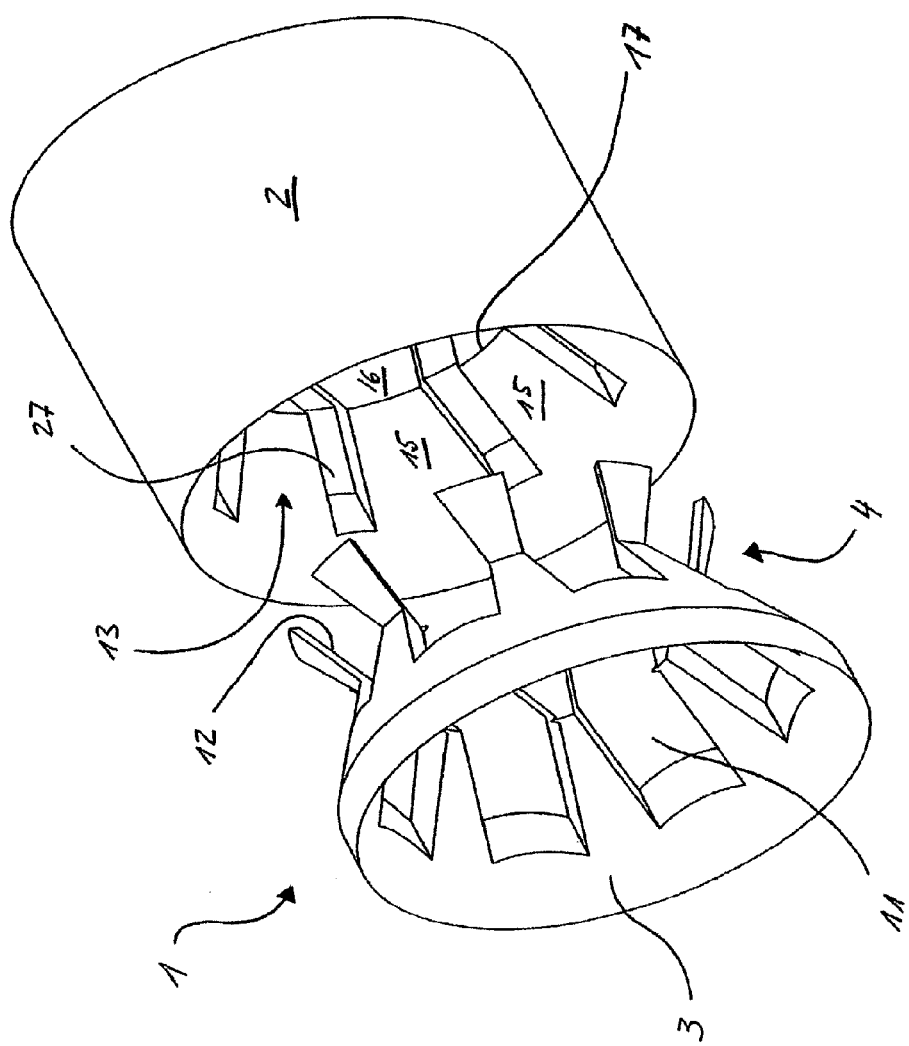
Figure 9B:
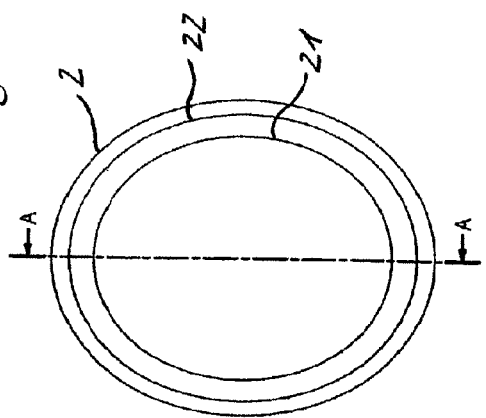
Figure 9D:
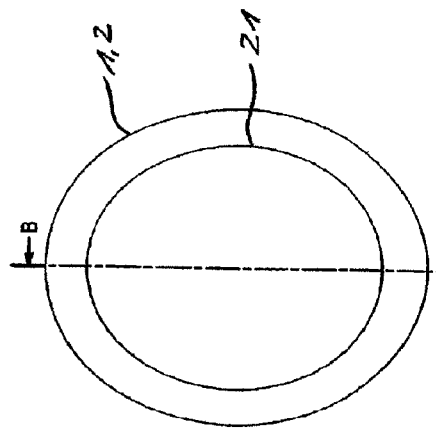
Figure 9A:
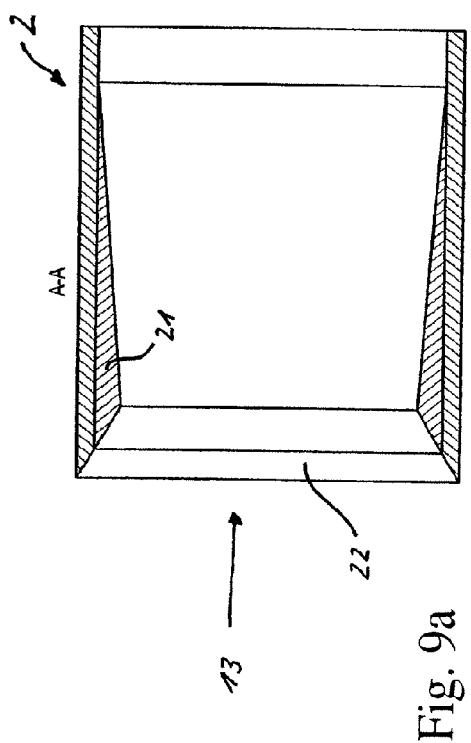
Figure 9C:
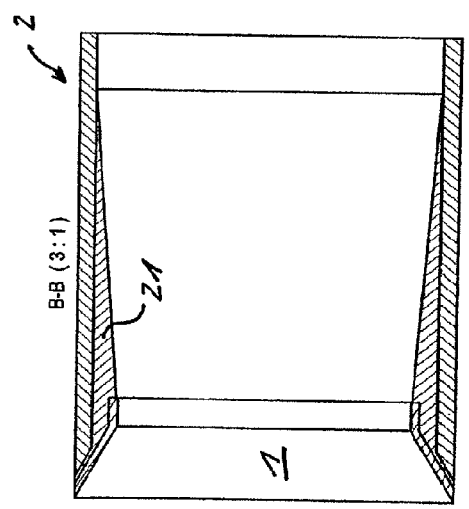
Figure 10:
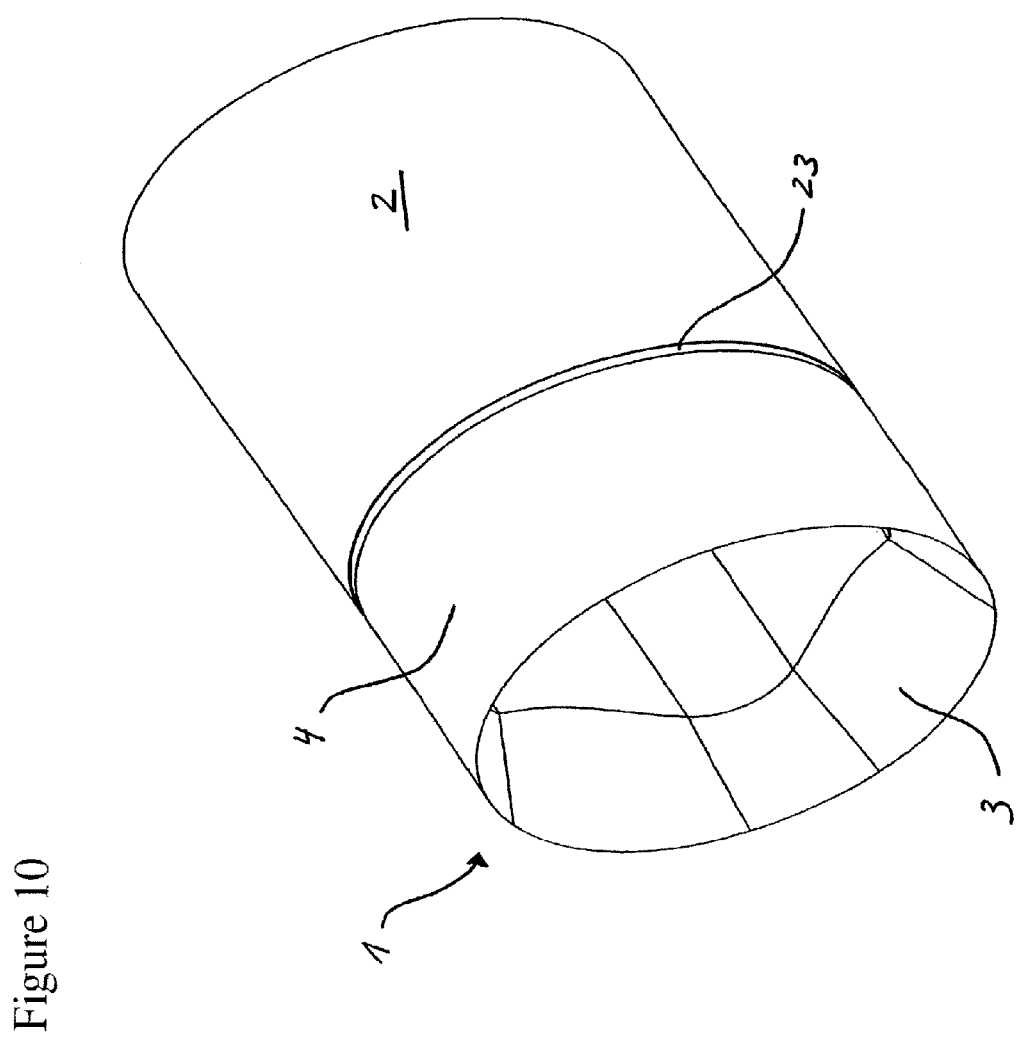
Figure 11A:
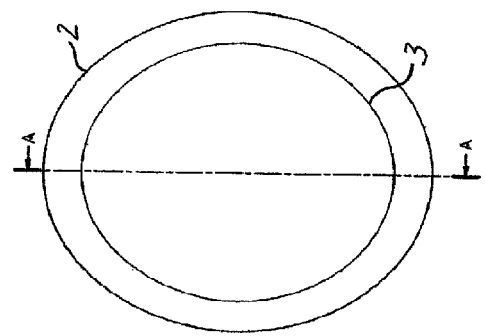
Figure 11B:
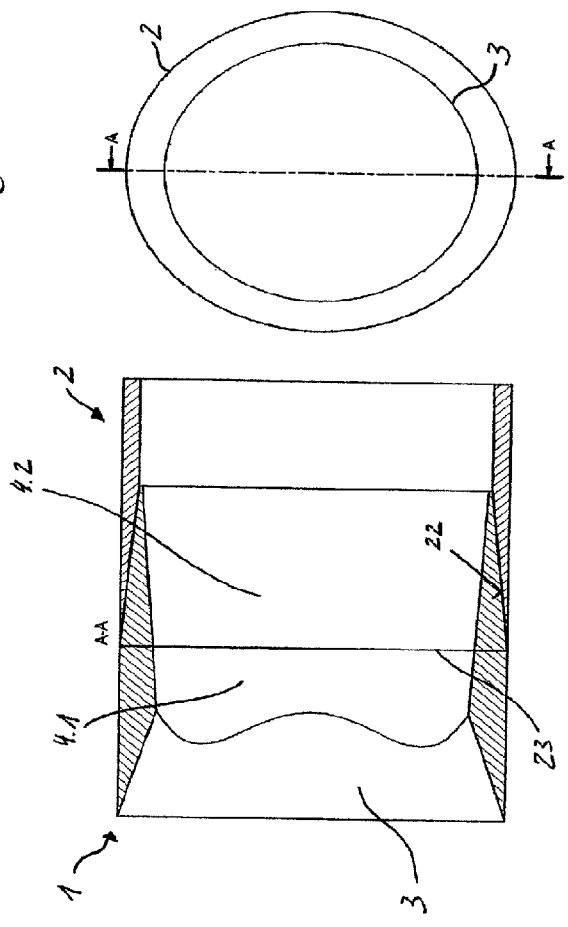
Figure 11C:
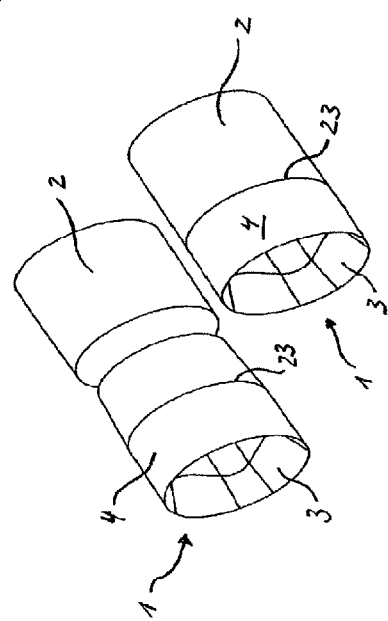
Figure 12B:
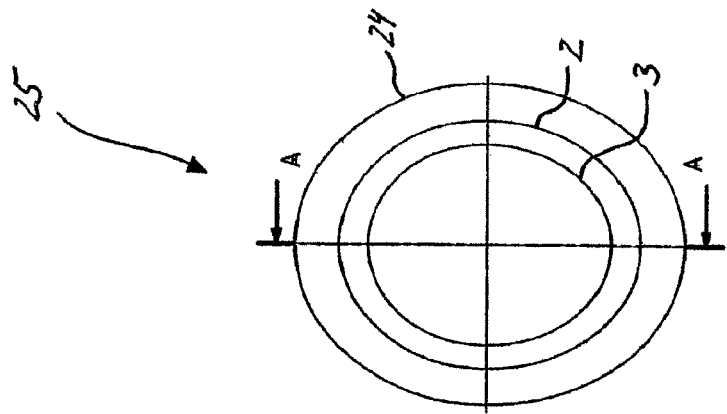
Figure 12A:
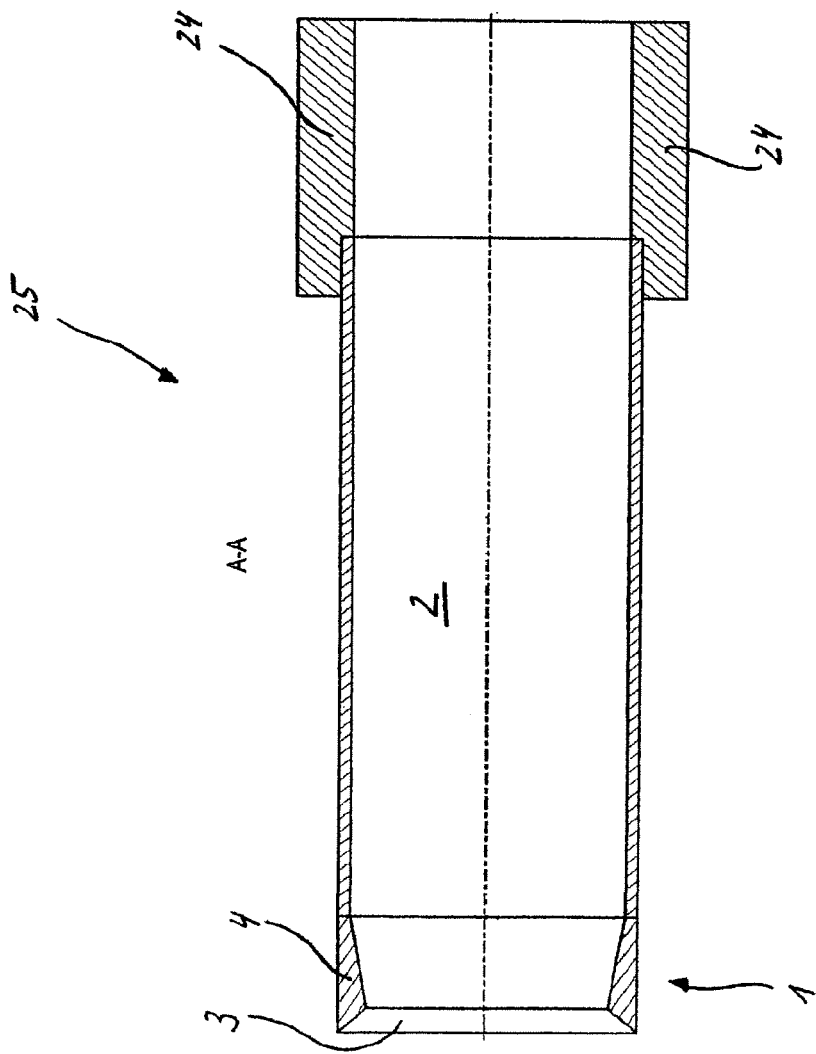
Figure 13:
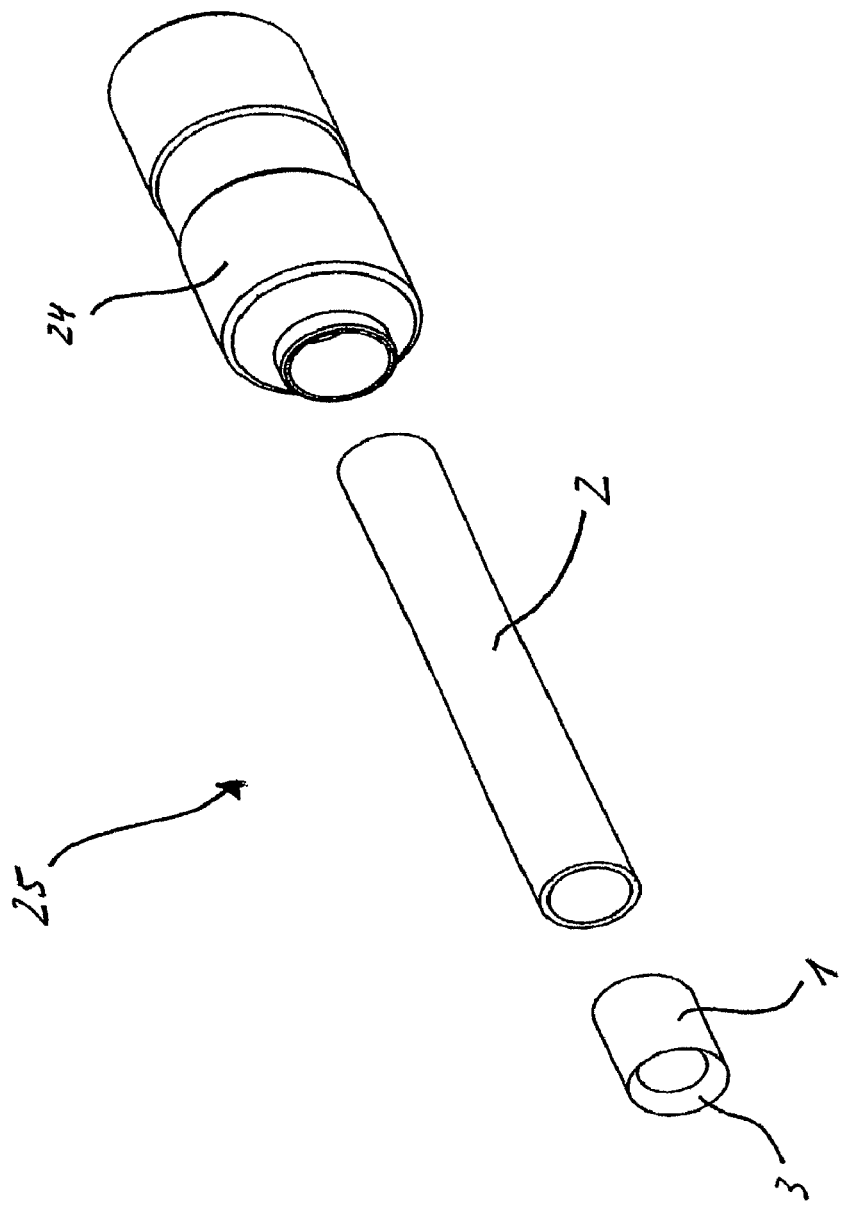
Figures 14A, 14B:
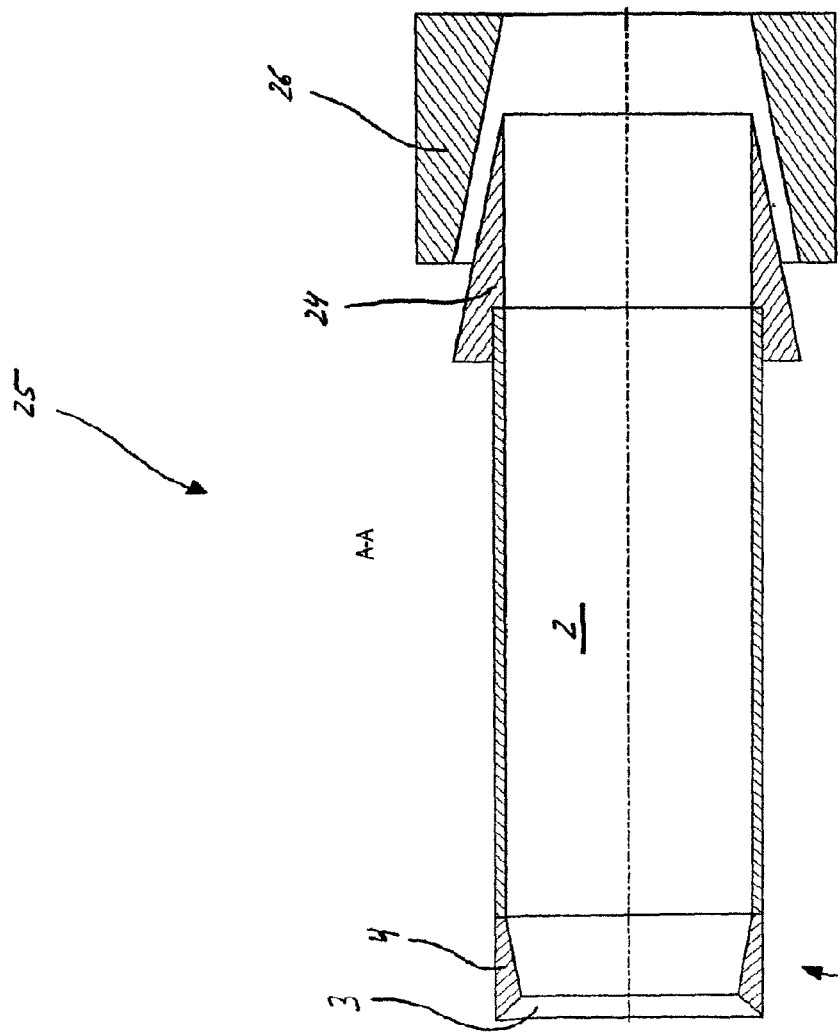
Figure 17:
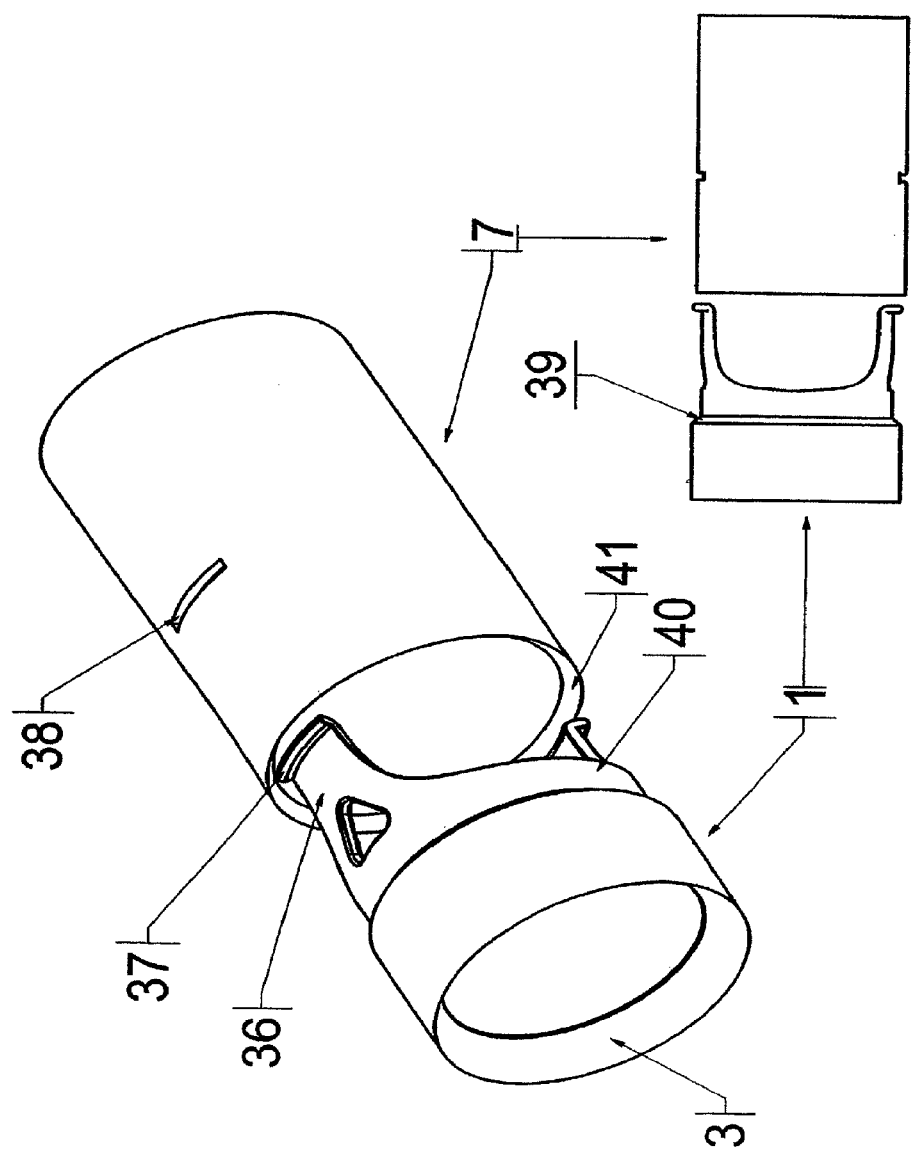
Figure 18:
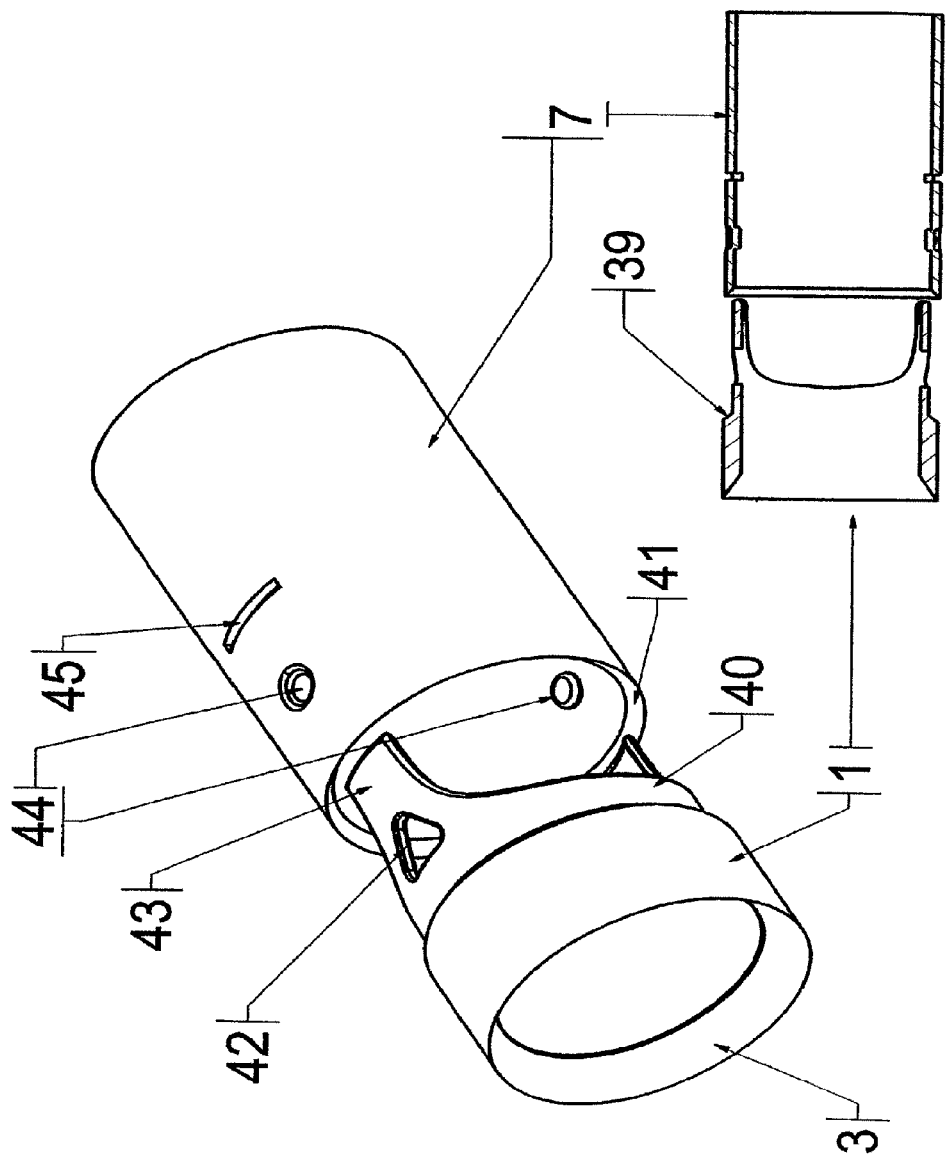
Figure 19:
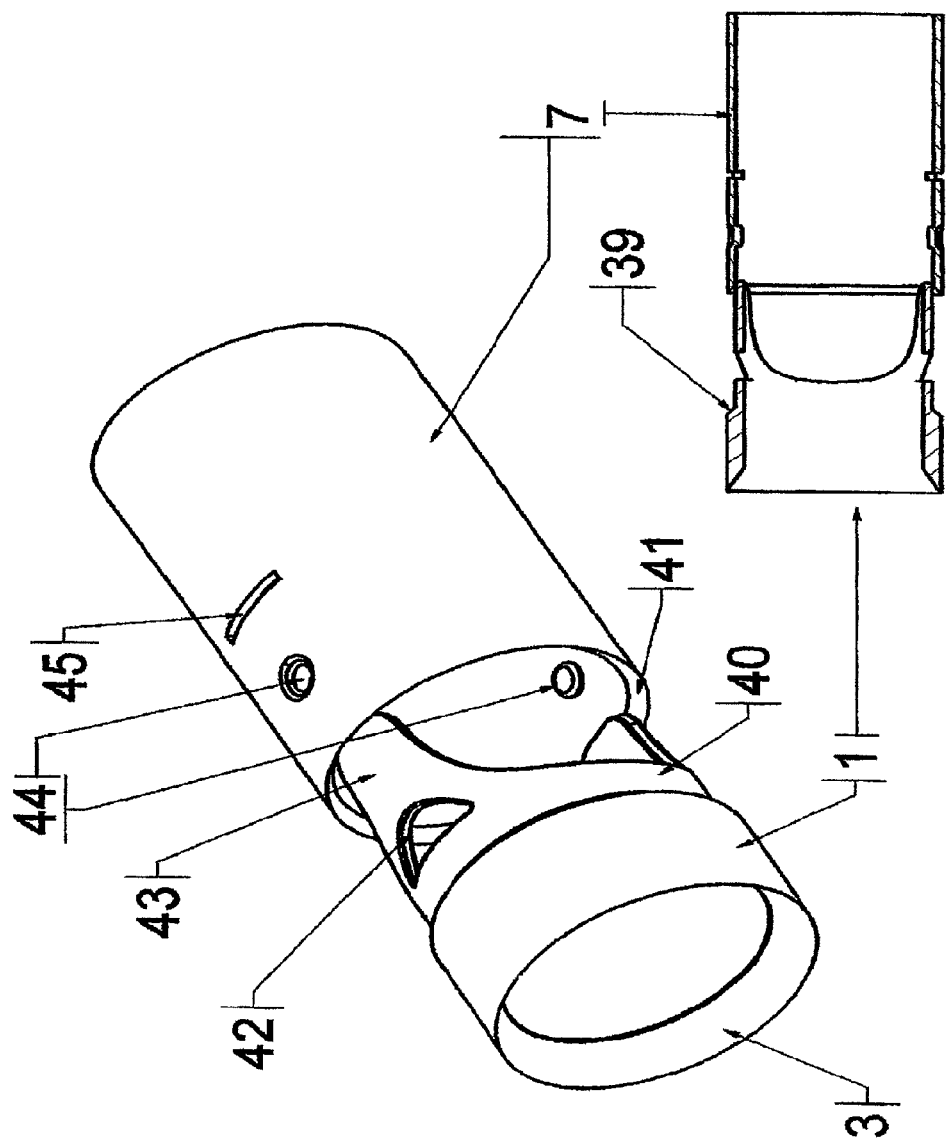

Further advantageous refinements of the invention may be gathered from the subclaims and from the exemplary embodiments illustrated below by means of the drawing in which:

FIG. 1 shows an exploded illustration (a), a top view (b), a part view (c) of the exploded illustration and a perspective illustration (d) of a first exemplary embodiment of a cutting element with part of a cutter support, FIG. 2 shows a perspective illustration of a second embodiment of a cutting element, FIG. 3 shows a perspective illustration of a further exemplary embodiment of a cutting element, FIG. 4 shows a perspective illustration of a further exemplary embodiment of a cutting element, FIG. 5 shows a perspective illustration of an exemplary embodiment of a cutting region of a cutting element, FIG. 6 shows a perspective illustration of a further exemplary embodiment of a cutting element, FIG. 7 shows a side view of an exemplary embodiment of a cutter support and of a cutting element, FIG. 8 shows a side view (a), a perspective part illustration (b) and a top view (c) of a further exemplary embodiment of a cutter support and of a cutting element according to FIG. 6 with a ring, FIG. 9 shows a side view (a) and a top view (b) of a further exemplary embodiment of a cutter support and a side view (c) and a top view (d) of this cutter support with an inserted cutting element, FIG. 10 shows a perspective illustration of the connection point between a cutter support and a cutting element, FIG. 11 shows a longitudinal section (a) and a top view (b) of a connection point between a cutting element and a cutter support according to FIG. 10, and a cutter support and a cutting element before and after assembly (c), FIG. 12 shows a side view (a) and a top view (b) of an exemplary embodiment of a hollow drill, FIG. 13 shows an exploded illustration of a further exemplary embodiment of a hollow drill, FIG. 14 shows a side view and a top view of a further exemplary embodiment of a hollow drill and of an adapter receiving the hollow drill, FIG. 15 shows a side view (a), a top view (b), a part view (c) of the side view and a perspective exploded illustration (d) of a further exemplary embodiment of a hollow drill, FIG. 16 shows a side view (a), a top view (b), a part view (c) of the side view, a perspective exploded illustration (d) and a part view (e) of the perspective exploded illustration of a further embodiment of a hollow drill, FIG. 17 shows a perspective exploded illustration (a) and a side view (b) of a further exemplary embodiment of a cutting element and of a cutter support, FIG. 18 shows a perspective exploded illustration (a) and a side view (b) of a further exemplary embodiment of a cutting element and of a cutter support, and FIG. 19 shows a perspective exploded illustration (a) and a side view (b) of an exemplary embodiment of a cutting element and of a cutter support.

The same reference symbols designate in the figures structurally or functionally identically acting components.

FIG. 1, illustration (a) shows an exploded illustration of a cutting element 1 connected to a cutter support 2 which is connected, in turn, to a shank 24. The cutting element 1, cutter support 2 and shank 24 are preferably components of a hollow drill. The cutting element 1 has a preferably conical cutting region 3 and an essentially cylindrical region 4 which is contiguous to the cutting region 3 and which preferably, if at all, has only low conicity, the drilling pitch being preferably 1:50 to 1:100 in order to allow a free run of the drill stock quickly. Illustration (b) shows a top view of the embodiment shown in illustration (a). Illustration (d) shows a perspective assembly drawing of the embodiment shown in illustration (a).

In this design, the internal geometry has an essentially star-shaped configuration. For this purpose, depressions 5 are provided on the inside of the cylindrical region 4 of the cutting element 1, run in the axial direction and are arranged at a distance from one another in the circumferential direction. The depressions 5 are connected to one another in each case via an elevation 6 preferably designed as a tip projecting into the cylindrical region. In the side view (a), the elevations 6 are illustrated as lines. The elevations 6 act virtually as runners, on which the cutting stock or the drill stock can slide along. This leads to a reduction in friction.

The illustration (c) shows as an enlarged detail the region enclosed by a circle in illustration (a). It can be seen that the depressions 5 level out shortly before that side of the cutting element 4 which faces away from the cutting region 3, that is to say merge into a cylindrical inner shape.

FIG. 2 shows a further embodiment of a cutting element 1. The cutting element 1 is composed of a preferably conical cutting region 3 and of an essentially cylindrical region 4. The cylindrical region has on the inside depressions 5 arranged at a distance from one another in the circumferential direction and opening in the direction of the cutting region. The distances between the depressions 5 are preferably dimensioned identically. The depressions 5 are connected to one another via edges 7 which may be of planar, concave, convex or wavy shape. The cylindrical region 4 therefore has a multi-edged inner shape in a first part region 4.1. This multi-edged inner shape preferably merges conically into a part region 4.2 having a cylindrical inner shape. During this transition, preferably, the diameter of the cylindrical region 4 decreases. The entire essentially cylindrical region 4 may have a conical profile. However, even only the part region 4.1 may have a conical profile, and the part region 4.2 may have a uniform diameter, or vice versa. The multi-edged inner shape and/or the conical profile give/gives rise to a low coefficient of friction on the inside of the cutting element 1.

Lubricant is preferably embedded in the edges 7 and may be selected in such a way that it becomes liquid only when a specific limit temperature is overshot.

FIG. 3 shows a perspective illustration of a further embodiment of a cutting element 1 with a preferably conical cutting region 3 and with an essentially cylindrical region 4 contiguous to the cutting region 3. The cylindrical region 4 has depressions 5 which run helically on the inside of the region 4. The depressions 5 may additionally run at least partially in the axial direction. Furthermore, the depressions 5 may be connected to one another to form a single helical depression 5. The depressions 5 are preferably arranged in a first part region 4.1 of the cylindrical region 4, to which part region is contiguous, at the end opposite the cutting region 3, a second part region 4.2 which preferably has a cylindrical inner shape. The part region 4.1 with the depressions 5 preferably merges conically into the cylindrical part region 4.2, the diameter of the part region 4.1 decreasing. The part region 4.2 may likewise be designed conically.

The helical configuration of the depressions 5 leads to a corresponding configuration of elevations on the inside of the cylindrical region 4 and thus to a displacement of contour lines on the inside. The cutting stock is shaped at an early stage during a cutting operation by these elevations 8. This leads to a reduction in the axial pressures arising. By the elevations or the contour lines defined by the depressions being predetermined, a defined deformation or folding of the cutting stock can be initiated.

FIG. 4 shows in perspective a further embodiment of a cutting element 1 with a preferably conical cutting region 3 and with an essentially cylindrical region 4. The embodiment illustrated differs from the embodiments illustrated in FIGS. 1 to 3 particularly in that the cutting region 3 has depressions 9. In addition to the depressions 9 of the cutting region, the cylindrical region 4 may also have, in particular, the depressions 5 illustrated in FIGS. 1 to 3. The depressions 9 preferably have a helical profile and, if they are arranged contiguously to one another, may form a single helical depression 9. The depressions 9 form elevations 10 which can bring about deformations of the cutting stock and thus minimize axial pressures arising during cutting.

This embodiment is particularly suitable for the cutting of rubber and soft materials.

FIG. 5 illustrates a further embodiment of a cutting region 3 of a cutting element. The cutting region 3 has concave depressions 9, between which is arranged in each case an elevation 10 of jag-shaped design. This configuration of the cutting region 3 allows a good penetration of the cutting element into the material to be cut. It can be combined with the embodiments illustrated in FIGS. 1 to 3.

A further embodiment of a cutting element 1 is illustrated in FIG. 6. Here, too, the cutting element 1 has a preferably conical cutting region 3 and an essentially cylindrical region 4 contiguous to the cutting region 3. The cylindrical region 4 has depressions which are shaped as incisions or slits 11. The slits 11 are preferably open on the outside of the cylindrical region 4, that is to say they extend onto the outside of the cutting element 1. The incisions 11 are preferably arranged at a distance from one another in the circumferential direction on the inside of the cylindrical region 4 and preferably run in the axial direction. They are connected to one another via wall segments 12 which are also designated as tongues. The wall segments 12 may have a planar or curved surface. The incisions 11 may project into the cutting region 3.

The cutting element 1 illustrated in FIG. 6 constitutes an exchangeable cutting element which can be fastened in a cutter support without a permanent connection, for example by means of soldering, adhesive bonding or welding. If the cutting element has become blunt or the cutting stock is changed, the cutter can be exchanged by being pulled out of the cutter support.

The cutting element 1 is pushed into a cutter support and the tongues 12 are pressed outward and therefore against the cutter support by the cutting stock. The cutting element 1 is held in the cutter support particularly via clamping forces.

Combinations of the exemplary embodiments illustrated in FIGS. 1 to 6 are possible. Thus, the cutting element 1 illustrated in FIG. 6 may have a cutting region 3 according to FIGS. 4 and 5. The slits 11 of FIG. 6 may likewise run helically. Additionally or alternatively, the tongues 12 may taper inward to a point according to the embodiment illustrated in FIG. 1.

In the exemplary embodiment according to FIG. 2, the depressions 5 may likewise have a helical profile and/or be designed as incisions. Additionally or alternatively, the edges 7 may have tips pointing into the inner space of the cylindrical region 4. Further combinations are possible.

FIG. 7 shows a cutter support 2 with an orifice 13 for receiving one of the cutting elements illustrated in FIGS. 1 to 6. The cutter support 2 illustrated is suitable particularly for receiving an exchangeable cutting element 1 according to FIG. 6. A cutting element 1 of this type is illustrated in FIG. 7 shortly before insertion into the cutter support 2. During the introduction of the cutting element 1 into the cutter support 2, the cylindrical region 4 having tongues 12 is compressed by a first conically narrowing region 15 which is contiguous to the orifice 13 of the cutter support 2. After a vertex 17 contiguous to the conically narrowing region 15 has been overcome, the diameter widens again in a further conical region 16 contiguous to the region 15, and the tongues 12 can move outward again. The vertex 17 prevents the cutting element 1 from simply being pulled out. What is known as a click or snap connection between the cutter support 2 and cutting element 1 is provided. The region 16 widening conically in the opposite direction to the orifice 13 preferably has slits 27 for receiving the tongues 12 of the cylindrical region 4 of the cutting element 1. This ensures anti-twist protection.

FIG. 8 shows a further embodiment of a cutter support 2 and of a cutting element 1 in a longitudinal section illustration, designated here as a side view (a), in a perspective part illustration (b) and in a top view (c). The cutting element 1 consists of a cutting region 3 and of an essentially cylindrical region 4. The essentially cylindrical region 4 has, preferably on its outside, a conical profile which leads to an increase in the outside diameter in the opposite direction to the cutting region 3. For receiving the cylindrical region 4 of the cutting element 1, the cutter support 2 has a conically designed region 18 in which the cone angle opens in the opposite direction to the orifice for the cutting element 1. The cone angle is preferably 2° to 3°. The outside of the cylindrical region 4 preferably runs at the same angle. The outside diameter of the cutting region 3 may correspond to the outside diameter of the cutter support 2. That end of the cylindrical region 4 which faces the cutting region 3 preferably has an outside diameter which corresponds approximately to the inside diameter of that end of the cutter support 2 which is on the cutting region side. The outside diameter of the cylindrical region 4 on the side opposite the cutting region 3 preferably likewise corresponds approximately to the inside diameter at that end of the conically designed region 18 of the cutter support 2 which is opposite the cutting region 3. Furthermore, the cylindrical region 4 of the cutting element 1 and the conically designed region 18 of the cutter support are approximately of equal length. By virtue of this configuration, a positive connection between the cutter support 2 and the cutting element 1 can be brought about. The cutting element 1 is thereby prevented from being simply pulled out.

Contiguous to that end of the conical region 18 of the cutter support 2 which is remote from the cutting region 3 is a preferably cylindrical region 20, the diameter of which is preferably smaller than the outside diameter of the cylindrical region 4 of the cutting element 1.

The cutter support 2 illustrated is suitable particularly for receiving an exchangeable cutter, such as is illustrated, for example, in FIG. 6. In order to prevent a twisting of the cutting element 1 in the cutter support 2, elevations on the inside of the conical region 18 of the cutter support 2 may be provided, which serve for receiving the slits 11 provided between the tongues 12. A preferably cylindrical ring, in particular a steel ring, may be provided within the cylindrical region 4 of the cutting element 1. The ring 19 serves for intensifying the pressure force which is exerted by the cutting stock on the tongues 12 or the cylindrical region 4.

The cutter support 2 illustrated in FIGS. 9(a) and (b) in a side view and in a top view preferably has a conically designed inner coating 21 illustrated by way of example. The diameter of the conical inner coating 21 preferably increases in the opposite direction to the orifice 13 which serves for receiving a cutting element 1.

In FIGS. 9(c) and (d), a cutter support 2 according to FIGS. 9(a) and (b) is illustrated in a side view and in a top view, in which a cutting element 1 is introduced positively into the inner coating 21. The cutting element may be introduced, for example, in that an adhesive both performs the role of the inner coating 21 and serves for adapting the cutting element 1. The holding force of the cutting element 1 with respect to the inner coating 21, which preferably comprises an adhesive, may be increased, inter alia, in that the cutting element 1 has tongues, not illustrated, which extend in the longitudinal direction and in the interspaces of which the inner coating 21 preferably comprising an adhesive may be embedded.

The selection of the coating material of the inner coating 21 depends basically on the drill stock to be cut. Normally, the inner coatings are implemented by low-melting solder and/or plastic, in particular by means of plastic injection, and/or curing adhesives and/or lacquers.

For the outer coating of the cutting element 3 or of the hollow drill, materials, such as, for example, TEFLON™, titanium nitrite, TiAlN, as it is known, and/or hard metal coatings or hard material coatings are normally used. Commonly available cutting materials and hard material coatings may be employed. Diamond coatings and/or coatings based on boron nitrite are used particularly preferably. Monocrystalline diamond coatings are used for preference. The diamond layers may be applied by the detonation coating method. The materials listed may also be employed for a coating provided on the inside of the cutting element 3.

If a permanent connection of the cutter support and cutting element is to be brought about, then, as illustrated in FIGS. 10 and 11, the cutter support 2 preferably has on its inside a conically shaped joining point 22, the radius of which increases on the cutting region side. Illustration (a) shows a side view and illustration (b) a top view of the connection point. Correspondingly, as is evident from FIG. 11, the cutting element 1 has in the essentially cylindrical region 4, on the outside, a conically narrowing region 4.2, the cone angle of which corresponds to the joining point 22. The length of the conical region 4.2 of the cutting element preferably corresponds approximately to the length of the joining point 22 of the cutter support. Illustration (c) shows the cutter support and cutting elements shown in FIGS. 10 and 11(a) and (b) before (figure on the left) and after (figure on the right) assembly.

The essentially cylindrical region 4 of the cutting element 1 may be designed, as illustrated in FIGS. 1 to 6 and 8.

The cutting element 1 and cutter support 2 may be connected to one another by means of a selflocking clamping connection, adhesive bonding, soldering and/or lasing or laser welding. Mixed forms of the connection techniques may be envisaged. In adhesive bonding or soldering, adhesive or solder is applied to the joining point 22. For an alternative or additional laser connection, the cutting element 1 and the cutter support 2 are welded together at a joining line 23 which preferably corresponds to that end of the cutter support which is on the cutting region side. The selection of the connection method depends on the materials used and on the costs to be taken into account. If the connection takes place by adhesive bonding and laser welding, a distention of the material and subsequent thickening are avoided. With soldering, reworking may, if appropriate, also be required.

The conical configuration of the joining point 22 of the cutter support 2 and of the region 4.2 of the cutting element 1 brings about a centering of the components. The opening angle, that is to say the angle between the side walls of the joining point which lie in one plane, should preferably be smaller than 60°. Since the cone angle, that is to say the angle between the inner wall and outer wall of the joining point 22, is kept small, selflocking effects advantageously arise, as is the case, for example, in a Morse taper.

The coating and connection examples illustrated in FIGS. 9 to 11 also apply, of course, to the cutting elements 1 and cutter supports 2 illustrated in FIGS. 6 to 8. Thus, coatings may likewise be provided in the cutter supports 2 of FIGS. 7 and 8. Furthermore, the conically widening region 18 of FIG. 8 or 16 of FIG. 7 may be provided with adhesive and/or solder, in order to make a permanent connection in addition to the connection brought about positively or by a clamping action. Additionally or alternatively, the cutter supports illustrated in FIGS. 7 and 8 may also be connected to the cutting element 1 by laser welding. In FIG. 7, a weld seam could be applied, for example, to that end of the conical region 15 which is on the cutting element side. In the embodiment according to FIG. 8, it is appropriate to have a weld seam at the transition, not designated in any more detail, between the cutting region 3 and the essentially cylindrical region 4 in which that end of the conical region 18 of the cutter support 2 which is on the cutting element side comes to bear.

FIGS. 12 and 13 show a hollow drill with a cutting element 1 and with a shank 24 which are connected to one another via a cutter support 2, in a side view (illustration 12(a)) and a top view (illustration 12(b)) and an exploded illustration (FIG. 13). The cutting element 1 has a cutting region 3 and an essentially cylindrical region 4. The cutting element 1 and the cutter support 2 may be designed as illustrated in FIGS. 1 to 11. The cutting element 1 and cutting support 2 are produced as separate parts. The shank 24 is also preferably produced as a separate part. The exploded illustration 13 of the hollow drill 25 makes clear construction from separate components.

Owing to the separate construction, the special intended use of the respective component can be taken into account in the selection of material and/or production method. Thus, in particular, the shank serves for chucking a hollow drill in a spindle of, for example, a machine tool. The shank 24 is produced preferably by lathe turning and/or drawing from machining steel, as it is known. This material is particularly suitable for machining on lathes with a high cutting speed. The shank 24 may be relatively soft, since it serves merely for chucking and for adaptation to various chucking systems. It additionally serves for receiving the cutter support 2.

The cutter support 2 is preferably produced from what is known as VA steel (high-grade steel DIN 1.4301), preferably by drawing. The material may additionally be refined. VA steel is characterized in that it does not rust and is corrosion-resistant. Other materials may, of course, also be employed. A carbon fiber tube may be used, for example, as the cutter support 2. In particular, the material used for the cutter support 2 must ensure high endurance strength.

The material and/or production method for the cutting element 1 are/is selected with a view to increasing the service life of the cutting element. Preferably, the cutting element 1 consists of a wear-resistant material, in particular of hardened and coated powder-metallurgical material. Alternatively or additionally, hard metals, ceramics and/or diamond coatings may also be employed. The inner configuration of the cutting element 1 can, by means of an additional coating, be coordinated optimally with the cutting stock to be drilled. However, the use of an additional coating is not absolutely necessary. In this case, in particular, the inner configurations according to FIGS. 1 to 6 come into consideration.

To connect the cutter support 2 and the shank 24, the cutter support 2 may be designed so as to narrow conically toward the connection point on the outside and the shank 24 may be designed so as to widen likewise conically towards the connection point on the inside, the cone angles having approximately the same dimension. The connection between the cutter support 2 and the shank 24 may therefore take place correspondingly to the connection illustrated in FIGS. 10 and 11. The connection methods described with regard to these figures may likewise be employed. An adhesive connection has the advantage that no heat distortion occurs, it is a cost-effective solution and the connection is chemically inert and satisfies the strength requirements. The cone angles of the cutter support 2 and of the shank 24 may, of course, also amount to 0°.

The hollow drill 25 is conventionally operated by means of a drill spindle. For this purpose, the drill spindle has an orifice for receiving the shank. To hold the shank, the orifice may have a special clamping chuck. Alternatively or else additionally, adapters 26 may be provided (see FIG. 14) which serve for adapting the shank circumference to the diameter of the orifice of the drill spindle. Illustration 14(a) shows a side view and illustration 14(b) the corresponding top view. The provision of adapters and/or clamping chucks is independent of a multi-piece version of the hollow drill.

If the cutter support 2 and the shank 24 are produced as separate components, then, instead of an adapter or when there is no suitable clamping chuck provided in the drill spindle, the shank can simply be exchanged for a suitable shank 24. Producing the cutter support 2 and the shank 24 separately thus results in a drilling tool which can be used in a flexible way.

FIG. 15 shows a further preferred exemplary embodiment of a cutting element 1, of a cutter support 2, of a shank 24 and of a hollow drill 25 in a side view (illustration (a)), a top view (illustration (b)) and an exploded illustration (illustration (d)). Illustration (c) shows as an enlarged detail the region enclosed by a circle in the illustration (a). Alternatively to the exemplary embodiment illustrated in FIGS. 10 and 11, the cutter support 2 has on its outside, on the side of the cutting element, a conically shaped first joining region 30, the radius of which decreases in the direction of the cutting element 1. The cone angle preferably amounts to 1.5°. Correspondingly, the cutting element 1 has on its inside, on the cutter support side, a conically widening joining region 32. The cone angle of the joining region 32 of the cutting element 1 is selected correspondingly to the cone angle of the first joining region 30 of the cutter support 2. The axial extent of the first joining region 30 of the cutter support 2 preferably corresponds to the axial extent of the joining region 32 of the cutting element 1. The inside diameter of the cutting element 1 is preferably smaller than the inside diameter of the cutter support 2, so that the cutting stock can pass, unimpeded, an edge which may be formed, if appropriate, at the joining point 34.

On the shank side, the cutter support 2 preferably likewise has on its outside a conically shaped second joining region 31, the radius of which decreases in the direction of the shank 24. Correspondingly, the shank 24 has on its inside, on the cutter support side, a conically widening joining region 33. The cone angle of the joining region 33 of the shank 24 is selected correspondingly to the cone angle of the second joining region 31 of the cutter support 2. The axial extent of the second joining region 31 of the cutter support 2 preferably corresponds to the axial extent of the joining region 32 of the shank 24. Alternatively, the cutter support may have on the shank side, on the inside, a conically shaped joining region, the radius of which widens in the direction of the shank, while the shank has on the outside, on the cutter support side, a conically narrowing joining region, the cone angle of which is selected correspondingly to the cone angle of the second joining region of the cutter support.

As already stated with regard to FIGS. 10 and 11, the cutting element 1 and cutter support 2 may be connected to one another by means of a selflocking clamping connection, by adhesive bonding, soldering and/or lasing or laser welding. Mixed forms of the connection techniques may be envisaged. In this case, the first joining region 30 of the cutter support 2 and the joining region 32 of the cutting element 1 are assembled to form a joining point 28. By means of corresponding connection techniques, the second joining region 31 of the cutter support and the joining region 33 of the shank 24 can be connected to one another to form a joining point 29.

By an appropriate configuration of the cutter support and cutting element, a click or snap connection, as it is known, between the cutter support and cutting element or between the cutter support and shank can also be provided, similarly to the exemplary embodiment illustrated particularly in FIG. 7, in the exemplary embodiment illustrated in FIG. 15. Such a configuration for a snap connection between the cutting element 1 and cutter support 2 is illustrated in FIG. 16. The exemplary embodiment illustrated in FIG. 16 differs from the exemplary embodiment illustrated in FIG. 15 in that slits 35 running axially are provided in the first joining region 30 of the cutter support 2. The slits 35 form tongues 36 which, when the joining region 30 of the cutter support 2 is introduced into the joining region 32 of the cutting element 1, are compressed and thereby bring about a clamping connection. Preferably, the joining region 32 of the cutting element 1 is designed such that it has a counter contour corresponding to the slits 35 and to the tongues 36; in particular, a conically widening region may be contiguous (not illustrated) via a vertex to a region narrowing conically in the cutting region direction, so that the tongues 36 can move outward again in the conically widening region. This gives rise to what is known as a snap connection. The vertex prevents the cutter support or the cutting element from simply being pulled out. For this purpose, the conically widening region of the joining region 32 of the cutting element 1 preferably has slits for receiving the tongues 36 of the cutter support 2, thus ensuring anti-twist protection. The second joining region 31 of the cutter support and the joining region 33 of the shank 24 may be configured correspondingly.

Of course, conically designed joining regions may be dispensed with both in the cutting element and cutter support and in the cutter support and shank, so that, to form a hollow drill, the end faces of the cutting element and cutter support or of the cutter support and shank are joined together or are connected to one another.

FIG. 17 shows a further preferred exemplary embodiment of a cutting element 1 and of a cutter support 2, specifically in an exploded illustration according to illustration 17a and in a side view according to illustration 17b. The cutting element 1 is distinguished in that it can be connected releasably to the cutter support, to be precise by being pushed in. The cutting element 1 has, in a circumferential region facing away from the cutting region 3, a conical chamfer 39 which descends at an angle of 45° to 15° to the nominal inside diameter of the cutter support 7. A cylindrical region 40 with a cylindrical circumferential surface is contiguous to the chamfer 39 and is designed such that it can be pushed into the cutter support 7. The cutter support has a conical region 41 which opens in the direction of the cutting element 1 and the angle of inclination of which is preferably coordinated with that of the conical chamfer 39. The cylindrical region 40, the conical chamfer 39 and the conical region 41 fix the cutting element 1 in the cutter support 7 in the circumferential region.

The cylindrical region 40 has at least one, preferably two diametrically opposite tabs 36 which are thickened at their end facing away from the cutting region 3, so that holding noses 37 are formed. These holding noses are located, after the cutting element 1 has been mounted in the cutter support 7, in depressions or perforations 38 which are provided in the wall of the cutter support 7. The holding noses have the task of fixing the cutting element captively in the cutter support and of retaining it when the hollow drill is pulled out of a drillhole. They have the function, moreover, of transmitting a torque from the cutter support 7 to the cutting element 1. It must be remembered, in this case, that the conical chamfer 39 and the conical region 41 likewise serve for transmitting a torque from the cutter support 7 to the cutting element 1.

The holding noses cooperate with perforations 38 in the wall of the cutter support 7, the side edges of the perforations being selected such that, on the one hand, axial tensile forces are built up between the cutting element 1 and the cutter support 7. The result of these is that, between the conical chamfer 39 and the conical region 41, frictional forces are built up which make it possible to transmit a torque. On the other hand, the edges, measured in the circumferential direction, of the perforations 38 are selected such that these bear against the holding noses. As a result, a relative rotation between the cutting element 1 and the cutter support 7 is prevented and a torque is transmitted from the cutter support 7 to the cutting element 1.

If perforations 38 for the holding noses 37 are provided in the wall of the cutter support 7, it is possible in a particularly simple way to unlock the connection between the cutting element and cutter support and exchange the cutting element 1.

If the possibility of unlocking the holding noses 37 through the wall of the cutter support 7 is dispensed with, it is also possible merely to provide on the inside of the cutter support depressions into which the holding noses 37 engage. In this case, the edges of the depressions are designed and selected such that, on the one hand, axial tensile forces are built up between the cutting element 1 and the cutter support 7, and, on the other hand, a torque can be transmitted from the cutter support 7 to the cutting element 1.

FIG. 18 shows a further preferred exemplary embodiment of a cutting element 1 and of a cutter support 7, illustration 18a reproducing an exploded illustration and illustration 18b a longitudinal sectional illustration also designated here as a side view.

Here, again, the cutting element 1 is provided with a conical chamfer 39 which is coordinated with a conical region 41 at the front end of the cutter support 7, the conical chamfer 39 preferably descending at 45° to 15° to the nominal inside diameter of the cutter support 7.

The cutting element 1 is again connected releasably to the cutter support 7 and can be pushed into the latter. Contiguous to the conical chamfer 39 is a cylindrical region 40, the outside diameter of which is smaller than or equal to the inside diameter of the cutter support 7. Said cylindrical region again has at least one, here two, diametrically opposite tabs 43 which run out, flat, that is to say have no thickenings, contrary to the exemplary embodiment according to FIG. 17. The tabs have in their middle regions perforations 42 which are preferably of triangular design, one triangle edge running in the circumferential direction of the cutting element 1 and consequently being arranged essentially parallel to the conical chamfer 39 or to the conical region 41. The two further sides of the triangular perforations 42 point away from the cutting region 3 and consequently in the direction of the end of the tabs 43 and in the direction of the cutter support 7. The two sides preferably form an angle of 60° to 120°.

At least one projection, designated hereafter as a wart 44, is provided on the inner surface of the cutter support 7. The number of warts preferably depends on the number of tabs 43 on the cutting element 1. Two opposite warts 44 are therefore provided here. Here, the warts are embossed or pressed from outside into the wall of the cutter support 7, so that corresponding depressions are present on the circumferential surface of the cutter support 7.

The warts 44 have the task of holding the cutting element 1 captively on the cutter support 7. When the cutting element 1 is pushed into the cutter support 7, said warts latch into the perforations 42 and thus hold the cutting element securely in the cutter support 7.

By means of the warts 44, tensile forces can be exerted on the cutting element by the cutter support 7 when the hollow drill is pulled out of a bore. Moreover, a torque can be transmitted from the cutter support 7 to the cutting element 1. Furthermore, torques are transmitted from the cutter support to the cutting element via the conical chamfer 39 and the conical region 41.

The warts 44 are preferably of circular design, but may also be triangular, the flanks of the warts 44 then preferably being adapted to the contour of the perforations 42 in the tabs 43. Both circular and triangular warts 44 ensure that, in the case of an increasing torque, the surface pressure of the conical chamfer 39 and of the conical region 41 increases, so that the operating reliability of the hollow drill is enhanced.

It is clear from FIG. 18 that the wall of the cutter support 7 has an orifice 45. This serves for demounting the cutting element 1: it is possible to press the tabs 43 inward through the orifice 45, so that the warts 44 no longer engage into the perforations 42 and the cutting element 1 can be pulled out of the cutter support 7.

It becomes clear from the explanations that, to unlock the tabs 43, a force acting radially inward merely has to be exerted on these. The contour of the orifice 45 is therefore freely selectable. An elongate rectangular orifice extending in the circumferential direction of the cutter support 7 was illustrated by way of example in FIG. 18. It is perfectly possible, however, here too, to provide a round or polygonal orifice.

FIG. 19 shows, in illustration a), a perspective exploded illustration and, in illustration b), a side view of an exemplary embodiment of a cutting element 1 and of a cutter support 7. 18b a side view.

In this exemplary embodiment, the cutting element 1 is again distinguished in that it can be plugged releasably into the cutter support 7 and connected to the latter. The cutting element is provided at the distance from the cutting region 3 with a conical chamfer 39 which emanates from the circumferential surface and which tapers preferably at an angle of 45° to 15° to the nominal inside diameter of the cutter support 7. Contiguous to the conical chamfer 39 is a cylindrical region 40, the outside diameter of which is smaller than or equal to the inside diameter of the cutter support 7. This cylindrical region is provided at its end facing the cutting element 1 with a conical region 41, the angle of inclination of which is adapted to that of the conical chamfer 39 such that here, as in the exemplary embodiments described above, the conical chamfer 39 bears over its area against the conical region 41.

The cylindrical region 40 merges into at least one, preferably two mutually opposite tabs 43 which, contrary to the exemplary embodiment according to FIG. 17, have a flat design at the end, that is to say have no thickening. The at least one tab has in its middle region a perforation 42 which, in its region facing away from the conical chamfer 39, is designed arcuately, preferably in the form of an arc of a circle, while the opposite longitudinal edge of the perforation 42 here runs in the circumferential direction of the cutting element 1, consequently parallel to the conical chamfer 39 or to the conical region 41.

The inner surface of the cutter support 7 is provided with at least one wart 44, preferably two mutually opposite warts 44. Finally, here, as in the exemplary embodiment according to FIG. 18, the number of warts can be selected virtually freely. Even two or four pairs of mutually opposite warts 44 may be provided, which can then engage into the perforations 42 of the tabs 43 of the cutting element 1. Here, as in the exemplary embodiments shown in FIGS. 17 and 18, the number of tabs is also freely selectable. Thus, even more than two tabs may be provided.

Here, too, the warts 44 have the task of holding the cutting element captively in the cutter support 7, in particular of transmitting tensile forces to the cutting element 1 when the hollow drill is drawn back, so that said cutting element can be pulled safely out of the drill hole. Moreover, the warts 44 serve for transmitting torque forces from the cutter support 7 to the cutting element 1, a torque also being transmitted here from the conical region 41 to the conical chamfer 39.

The warts 44 are preferably of circular design, but may be provided on the rear side facing away from the cutting element 1 with a contour which is adapted to the contour of the perforations 42. What can be achieved thereby is that the rear side of the warts 44 bears over its area against that region of the perforation 42 which is designed in the form of an arc of a circle.

If, when a high torque is transmitted from the cutter support 7 to the cutting element 1, the friction between the conical region 41 and the conical chamfer 39 is not sufficient to transmit the torque and a relative rotation takes place between the cutter support 7 and the cutting element 1, then the wart 44 moves onto the arcuately designed region of the perforation 42, so that virtually a wedge mechanism is then formed, thus leading to an increase in the surface pressure between the conical region 41 and the conical chamfer 39. The relative rotation between the cutter support 7 and cutting element 1 therefore leads to an increase in the tensile forces which pull the cutting element 1 into the cutter support 7, thus increasing the surface pressure on the surfaces bearing against one another (conical chamfer 39, conical region 41).

In the exemplary embodiments according to FIGS. 18 and 19, the warts may be flattened on their side facing the cutting element 1, that is to say they may descend in the direction of the inner surface of the cutter support 7, so that the cutting element 1 can be introduced more easily into the cutter support 7: the tabs 43 can slide along on the descending flanks of the warts 44 and be pressed inward until the warts 44 engage, virtually snap into the perforations 42.

In the exemplary embodiment illustrated in FIG. 19, too, there is provision for the wall of the cutter support 7 to have an orifice 45. Forces acting radially inward can be exerted through the latter onto the at least one tab 43, so that this can be pressed inward to an extent such that the warts 44 can emerge from the perforations 42, with the result that the cutting element 1 is released.

Here, too, it is illustrated in FIG. 19 merely by way of example that the orifices 45 are designed as an elongate rectangle and extend in the circumferential direction. Here, too, for example, circular orifices may be provided so that unlocking forces can be exerted on the tabs 43.

It becomes clear from the explanations regarding the exemplary embodiments according to FIGS. 17, 18 and 19 that a releasable connection can be implemented in a simple way between the cutting element 1 and the cutter support 7. In this case, additional torque forces can be transmitted by virtue of the type of locking: in the exemplary embodiment according to FIG. 17, holding noses are provided, and in the exemplary embodiment according to FIGS. 18 and 19 there is provision for at least one wart 44 to engage into a perforation, the contour of which is designed such that an additional torque can be transmitted. This takes place either in that the wart bears against the side walls of the perforation 42 or else in that the perforation has an arcuate contour, along which the wart 44 slides in the event of a relative rotation between the cutting element 1 and the cutter support 7, such that additional tensile forces are exerted on the cutting element 1 and its conical chamfer 19 bears with increased force against a conical region 41 of the cutter support 7.

The construction of the hollow drill can in this case be implemented very simply and cost-effectively.

In the illustration of the exemplary embodiments according to FIGS. 17 to 19, particular emphasis was placed on the coupling possibilities between the cutting element 1 and cutter support 7. The more detailed configuration of the cutting element 1 and of the cutter support 7, in particular of the inner contour of these two parts, is not clear from FIGS. 17 to 19. It may be pointed out expressly here that all the configuration possibilities explained with reference to FIGS. 1 to 16 can also be implemented here in the exemplary embodiments according to FIGS. 17 to 19.

The invention claimed is:

1. A hollow drill comprising:
a hollow cutting element having a cutting region disposed on a free end, the cutting body having a longitudinal bore having a multiple-edged inner surface and an essentially cylindrical outer surface, the inner surface having a plurality of inside depressions arranged at regular intervals and opening in the direction of the cutting region, the cutting element having at least one tab disposed on a second end; and
a cutter support wherein the cutting element and cutter support are produced as separate components, the cutter support having an orifice disposed on a distal end for receiving the second end of the cutting element, the orifice being frusto-conically shaped in which the diameter of the frusto-conical orifice increases as the orifice extends farther from the distal end, and the cutter support including at lease one elevation,
wherein the cutting element is releasably connected to the cutter support when the second end of the cutting element is inserted into the orifice of the cutter support such that the at least one tab releasably engages the at least one elevation.

2. A cutting element for cutting material with a hollow drill, the cutting element comprising:
a generally hollow cutting body having a free end which forms a sharp, generally circular cutting edge and a second end adapted to be attached to an end of a hollow drill, the cutting body having an essentially smooth cylindrical outer surface, and a longitudinal bore extending therethrough, an inner surface of the bore defining a cutting region and a first part region,
wherein in the cutting region, the inner surface of the bore has a frusto-conical shape that narrows inwardly from the cutting region, and
wherein in the first part region, the bore extends inwardly from the cutting region towards the second end, the inner surface of bore in the first part region having a multiple-edged, non-circular shape where the multiple edges are separated by depressions arranged at regular intervals.

3. The cutting element as claimed in claim 2, wherein the depressions run in the axial direction and are arranged at a distance from one another in the circumferential direction.

4. The cutting element as claimed in claim 2, wherein the depressions are arranged at a distance from one another in the circumferential direction.

5. The cutting element as claimed in claim 2, wherein the inner surface merges into a cylindrical inner shape along a second part region proximate the second end.

6. The cutting element as claimed in claim 2, wherein the depressions run helically on the inner surface.

7. The cutting element as claimed in claim 2, wherein the cutting element consists of hard material coatings.

8. The cutting element as claimed in claim 2, wherein the cutting region has additional depressions which run helically.

9. The cutting element as claimed in claim 2, wherein a lubricant is embedded into the depressions in the first part region.

10. The cutting element as claimed in claim 9, wherein the lubricant changes to a liquid state when a specific limit temperature is overshot.

11. The cutting element as claimed in claim 2, wherein the depressions become slits on the second end such that the depressions extend through from the inner surface to the outer surface.

12. The hollow drill as claimed in claim 1, wherein a cylindrical ring is arranged in the opening adjacent the second end of the cutter element wherein the cylindrical ring is configured to bias the tabs against the cutter support.

13. The hollow drill as claimed in claim 2, wherein the second end includes at least one tab.

14. The hollow drill as claimed in claim 13, wherein the at least one tab has a holding device.

15. The hollow drill as claimed in claim 1, wherein the at least one tab has a perforation into which a projection emanating from the inside of the cutter support can engage.

16. The hollow drill as claimed in claim 15, wherein the perforation has an essentially triangular contour.

17. The hollow drill as claimed in claim 15, wherein the perforation is a concaved recess formed on the inner surfaces, wherein the perforation serves as a bearing surface for the projection of the cutter support.

18. The hollow drill as claimed in claim 17, wherein the perforation is arranged and coordinated with the projection such that, in the event of a relative rotation between the cutting element and cutter support, the tension forces acting in the axial direction between the cutting element and the cutter support increase.

19. The hollow drill as claimed in claim 1, wherein the cone angle of the frusto-conical orifice is 1° to 6°.

20. The hollow drill as claimed in claim 1, wherein the diameter of the cylindrical region has a smaller diameter than the conical orifice at the location at which it is furthest away from distal end of the cutter support.

21. The hollow drill as claimed in claim 1, wherein the cutter support includes at least one perforation defined in a wall of the orifice, into which a holding device of the cutting element engages.

22. The cutter support as claimed in claim 1, wherein the cutter support includes at least one perforation through which at least one tab of the cutting element can be acted upon with an unlocking force.

23. The cutting element as claimed in claim 2 wherein the bore in first part region has a frusto-conical shape such that the diameter increases as the bore extends from the cutting region toward the second end.

24. The hollow drill as claimed in claim 1, wherein the cutting element is connected releasably to the cutter support via a clamping connection.

25. The hollow drill as claimed in claim 1, wherein the cutting element is connected to the cutter support via an adhesive bond.

26. The hollow drill as claimed in claim 1, further including a shank which is produced as a separate component, the materials of the cutting element, cutter support and shank being selected in each case as a function of the intended use of the respective component.

27. The hollow drill as claimed in claim 1, wherein the second end of the cutting element the depressions become slits which extend through from the inner surface to the outer surface, the slits define at least one tabs on the second end.

28. The hollow drill as claimed in claim 1, wherein the at least one tab of the cutting element includes a holding device.

* * * * *

UNITED STATES PATENT AND TRADEMARK OFFICE
CERTIFICATE OF CORRECTION

PATENT NO. : 7,785,047 B2  Page 1 of 1
APPLICATION NO. : 11/720355
DATED : August 31, 2010
INVENTOR(S) : Achim Jauch It is certified that error appears in the above-identified patent and that said Letters Patent is hereby corrected as shown below:

Column 16, Line 67, Claim 20:

After "furthest away from" insert -- the --.

Column 17, Line 10, Claim 23:

After "bore in" insert -- the --.

Column 18, Line 12, Claim 27:

After "at least one" delete "tabs" and insert -- tab --.

Signed and Sealed this

Sixteenth Day of November, 2010

David J. Kappos
*Director of the United States Patent and Trademark Office*